United States Patent
Alfieri et al.

(10) Patent No.: US 12,159,344 B2
(45) Date of Patent: *Dec. 3, 2024

(54) ACCELERATED PROCESSING VIA A PHYSICALLY BASED RENDERING ENGINE

(71) Applicant: NVIDIA CORPORATION, Santa Clara, CA (US)

(72) Inventors: Robert A. Alfieri, Chapel Hill, NC (US); Peter S. Shirley, Salt Lake City, UT (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/339,166

(22) Filed: Jun. 21, 2023

(65) Prior Publication Data
US 2023/0334762 A1  Oct. 19, 2023

Related U.S. Application Data

(63) Continuation of application No. 17/321,323, filed on May 14, 2021, now Pat. No. 11,704,860.

(51) Int. Cl.
*G06T 15/06* (2011.01)
*G06F 9/48* (2006.01)
(Continued)

(52) U.S. Cl.
CPC .......... *G06T 15/06* (2013.01); *G06F 9/4881* (2013.01); *G06F 15/80* (2013.01); *G06T 15/005* (2013.01);
(Continued)

(58) Field of Classification Search
None
See application file for complete search history.

(56) References Cited

U.S. PATENT DOCUMENTS 9,465,619 B1  10/2016  Rottenstreich et al.
10,818,079 B2 * 10/2020 Uludag .............. G06T 11/40
(Continued)

FOREIGN PATENT DOCUMENTS

AU  3516301 A  10/2001
DE  102017127367 A1  6/2018

OTHER PUBLICATIONS

Notice of Allowance received for U.S. Appl. No. 17/321,317 dated Jul. 19, 2023, 16 pages.
(Continued)

*Primary Examiner* — Andrew G Yang
(74) *Attorney, Agent, or Firm* — Artegis Law Group, LLP

(57) ABSTRACT

One embodiment of a computer-implemented method for processing ray tracing operations in parallel includes receiving a plurality of rays and a corresponding set of importance sampling instructions for each ray included in the plurality of rays for processing, wherein each ray represents a path from a light source to at least one point within a three-dimensional (3D) environment, and each corresponding set of importance sampling instruction is based at least in part on one or more material properties associated with at least one surface of at least one object included in the 3D environment; assigning each ray included in the plurality of rays to a different processing core included in a plurality of processing cores; and for each ray included in the plurality of rays, causing the processing core assigned to the ray to execute the corresponding set of importance sampling instructions on the ray to generate a direction for a secondary ray that is produced when the ray intersects a surface of an object within the 3D environment.

28 Claims, 21 Drawing Sheets

(51) Int. Cl.
*G06F 15/80* (2006.01)
*G06T 15/00* (2011.01)
*G06T 15/80* (2011.01)
*G06T 17/00* (2006.01)

(52) U.S. Cl.
CPC ............ G06T 15/80 (2013.01); G06T 17/005 (2013.01); *G06T 2210/52* (2013.01)

(56) References Cited

U.S. PATENT DOCUMENTS

| | | |
|---|---|---|
| 2014/0333621 A1 | 11/2014 | Hillesland et al. |
| 2014/0340403 A1 | 11/2014 | Droske et al. |
| 2016/0283245 A1 | 9/2016 | Ben-Kiki et al. |
| 2017/0084055 A1 | 3/2017 | Kwon et al. |
| 2017/0154443 A1 | 6/2017 | Maksymczuk et al. |
| 2017/0178385 A1 | 6/2017 | Akenine-Moller |
| 2017/0206700 A1 | 7/2017 | Munkberg et al. |
| 2018/0018814 A1 | 1/2018 | Dahm et al. |
| 2018/0165868 A1 | 6/2018 | Kettner et al. |
| 2018/0293099 A1 | 10/2018 | Clohset et al. |
| 2020/0118299 A1 | 4/2020 | Iourcha et al. |
| 2020/0193681 A1 | 6/2020 | Saleh |
| 2020/0202606 A1 | 6/2020 | Akenine-Moller et al. |
| 2020/0211151 A1 | 7/2020 | Vaidyanathan et al. |
| 2021/0142555 A1 | 5/2021 | Karlik et al. |
| 2021/0327120 A1 | 10/2021 | Brownlee et al. |
| 2021/0382720 A1 | 12/2021 | Ganapathy et al. |
| 2021/0407172 A1 | 12/2021 | Clark et al. |
| 2022/0051466 A1 | 2/2022 | Doyle et al. |
| 2022/0197719 A1 | 6/2022 | Gurtovoy et al. |
| 2022/0335682 A1 | 10/2022 | Dave et al. |

OTHER PUBLICATIONS

Woop et al., "RPU: A Programmable Ray Processing Unit for Realtime Ray Tracing", http://www.sven-woop.de/papers/2005-Siggraph-RPU.pdf, 2005, 11 pages.

Notice of Allowance received for U.S. Appl. No. 17/321,338 dated Aug. 18, 2023, 12 pages.

Notice of Allowance received for U.S. Appl. No. 17/321,343 dated Aug. 4, 2023, 45 pages.

* cited by examiner

ACCELERATED PROCESSING VIA A PHYSICALLY BASED RENDERING ENGINE

CROSS-REFERENCE TO RELATED APPLICATIONS

This application is a continuation of the co-pending U.S. patent application titled, "ACCELERATED PROCESSING VIA A PHYSICALLY BASED RENDERING ENGINE", filed on May 14, 2021, and having Ser. No. 17/321,323. The subject matter of the related application is hereby incorporated herein by reference.

BACKGROUND

Field of the Various Embodiments

Embodiments of the present disclosure relate generally to computer science and architecture and, more specifically, to accelerated processing via a physically based rendering engine.

Description of the Related Art

In computer graphics, ray tracing techniques are oftentimes used to render a two-dimensional image of a three-dimensional scene. Ray tracing involves transmitting rays from a particular viewpoint into a three-dimensional scene and determining the different points at which the rays intersect the surfaces of different objects in the three-dimensional scene. Material shading operations are performed for each location where a ray intersects the surface of a particular object to determine the color of a corresponding pixel in the two-dimensional image.

To produce more photorealistic-looking results, object surfaces within a three-dimensional scene are oftentimes modeled using different layers of material properties, such as polish, reflectivity, diffuse behavior, translucency, and transparency, to name a few. Graph structures can then be generated that define the material properties of the object surfaces within the three-dimensional scene based on the different layers of material properties used to model the object surfaces. Among other things, a graph structure indicates how light interacts with object surfaces within the three-dimensional scene based on the material properties of the object surfaces as well as the relationships between the material properties of the object surfaces. When rendering the two-dimensional image of the three-dimensional scene, the material graphs are compiled into multiple material shader programs that are executed by a processor to perform the relevant material shading operations.

To accelerate graphics rendering, graphics processing computations oftentimes are offloaded to a graphics processing unit (GPU). A typical GPU is configured in a highly parallelized manner, where multiple processing cores process graphics data or other offloaded data across multiple different thread groups simultaneously utilizing either SIMD (same instruction, multiple data) or SIMT (same instruction, multiple thread) execution models. With SIMD or SIMT processing, the different threads in a thread group process different data based on the same instruction, which allows the processing cores within a GPU to perform highly parallel processing operations quickly and efficiently to substantially increase overall processing throughput.

A common problem with ray tracing, though, is that ray tracing operations normally cannot be executed in a highly parallel fashion using a GPU because each individual ray typically involves different inputs and different computations. For example, if two different rays were to intersect two different surfaces within a three-dimensional scene, then a different material shader program would need to be executed for each ray. For this reason, rays do not lend themselves readily to efficient parallel processing using either SIMD or SIMT execution models. Instead, rays typically need to be further sorted by material type so that groups of otherwise unrelated rays can be processed using SIMD or SIMT. Accordingly, as a general matter, the highly parallel architecture of conventional GPUs cannot be leveraged easily to accelerate ray tracing operations.

One way to enable GPUs and other types of parallel processors to perform ray tracing operations and other serial processing tasks more efficiently would be to add more transistors to these processors. To increase the number of transistors within a processor, though, either the die size would have to be increased, the transistors would have to be packed more densely, or the transistors would have to be smaller. Increasing die size is generally undesirable. Further, because the rates at which transistor size is decreasing and transistor density is increasing are slowing down, adding a substantial number of transistors to a processor would likely result in in a larger processor, which, as previously noted, would be undesirable. Accordingly, adding transistors to GPUs and other types of parallel processors in order to improve processing performance when performing ray tracing operations and other serial processing tasks is not a viable solution.

As the foregoing illustrates, what is need in the art are more effective ways to perform ray tracing operations and other serial processing tasks on parallel processors.

SUMMARY

One embodiment of the present disclosure sets forth a computer-implemented method for processing ray tracing operations in parallel. The method includes receiving a plurality of rays and a corresponding set of importance sampling instructions for each ray included in the plurality of rays for processing, wherein each ray represents a path from a light source to at least one point within a three-dimensional (3D) environment, and each corresponding set of importance sampling instruction is based at least in part on one or more material properties associated with at least one surface of at least one object included in the 3D environment. The method further includes assigning each ray included in the plurality of rays to a different processing core included in a plurality of processing cores. In addition, the method includes for each ray included in the plurality of rays, causing the processing core assigned to the ray to execute the corresponding set of importance sampling instructions on the ray to generate a direction for a secondary ray that is produced when the ray intersects a surface of an object within the 3D environment.

At least one technical advantage of the disclosed techniques is that a rendering engine is provided that is specially designed to perform ray tracing operations and other serial processing tasks with improved efficiency relative to prior art solutions. Accordingly, the rendering engine can be incorporated into a GPU or other parallel processing unit, and processing tasks that cannot be parallelized effectively across the conventional processing elements within the GPU or other parallel processing unit can be offloaded to the rendering engine, which increases overall processing performance and throughput. In this regard, multiple MIMD (multiple input, multiple data) processing cores are implemented within the rendering engine, where each processing core is configured to asynchronously process a different ray or other unit of serial processing work, which enables ray tracing operations and other serial processing tasks to be performed largely in parallel across the different processing cores. In addition, to further improve overall processing throughput, the rendering engine includes multiple pipelines that are designed to perform certain specialized processing tasks. During operation, the processing cores can offload the specialized processing tasks to the different pipelines, and a scheduler that resides within the rendering engine is configured to schedule the offloaded tasks across the different pipelines in an optimized manner. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
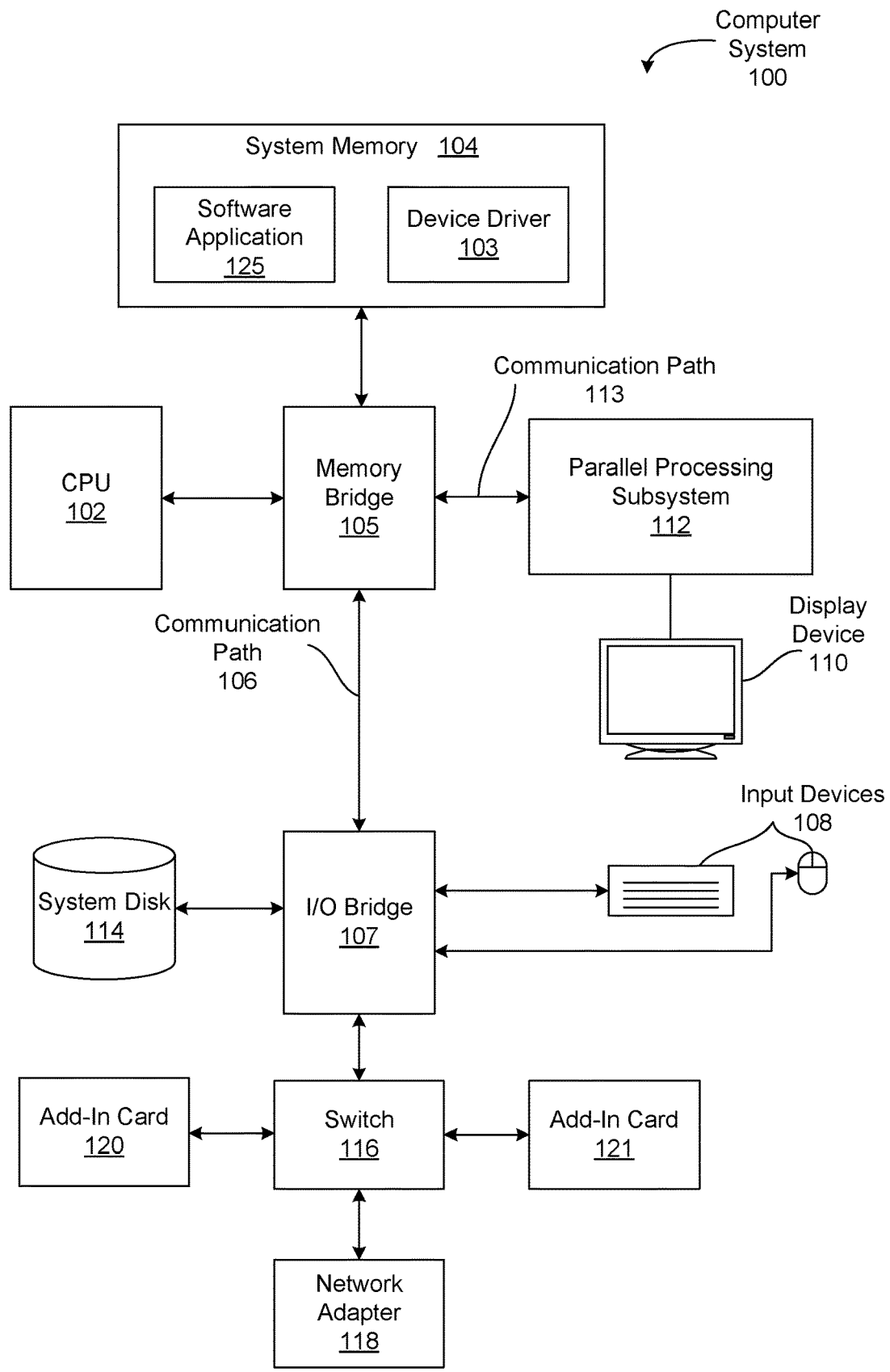
FIG. 1 is a block diagram illustrating a computer system configured to implement one or more aspects of various embodiments.

FIG. 1 is a block diagram illustrating a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
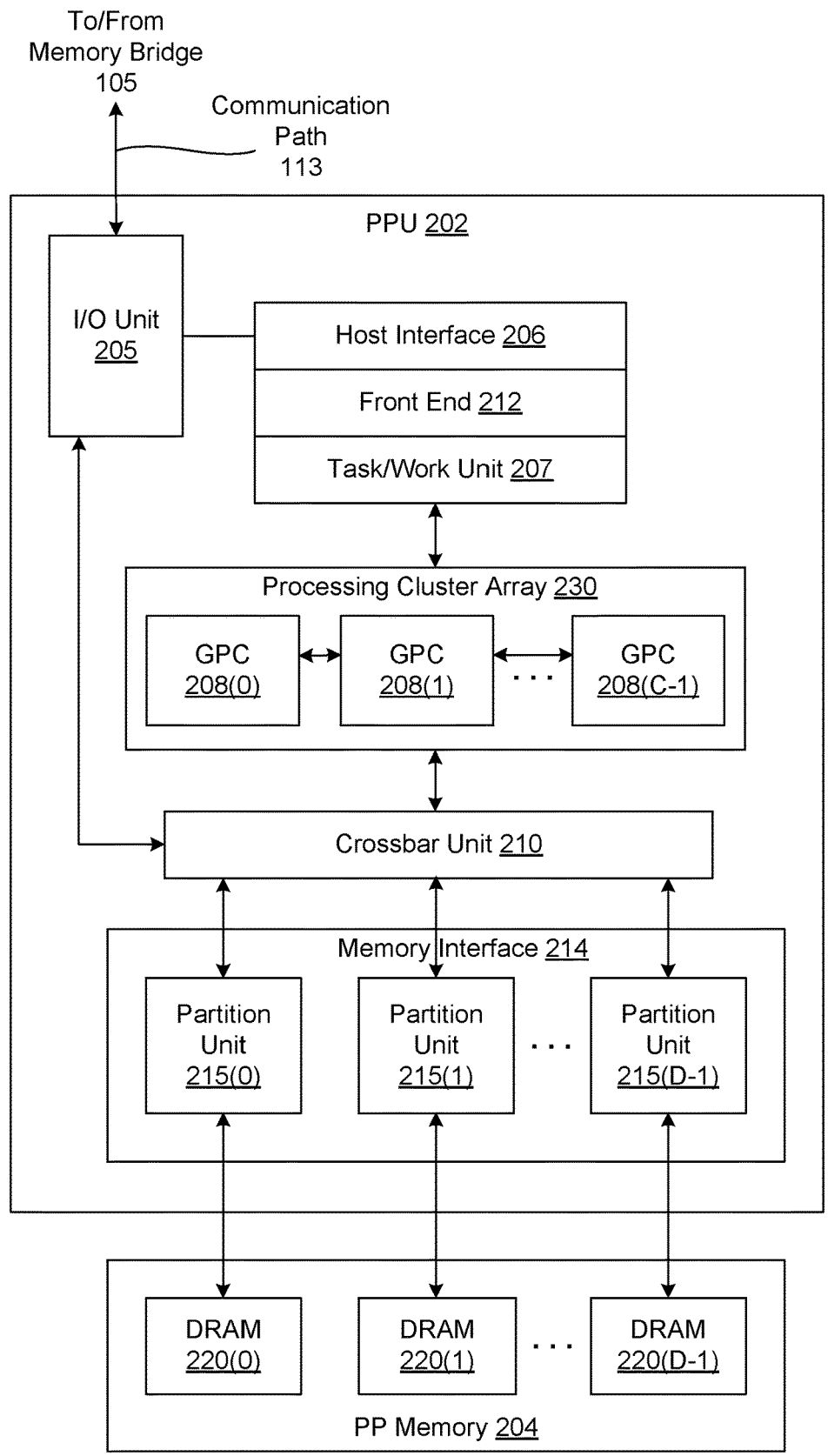
FIG. 2 is a block diagram of a parallel processing unit included in the parallel processing subsystem of FIG. 1, according to one embodiment.

FIG. 2 is a block diagram of a parallel processing unit (PPU) 202 included in the parallel processing subsystem 112 of FIG. 1, according to one embodiment. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random-access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
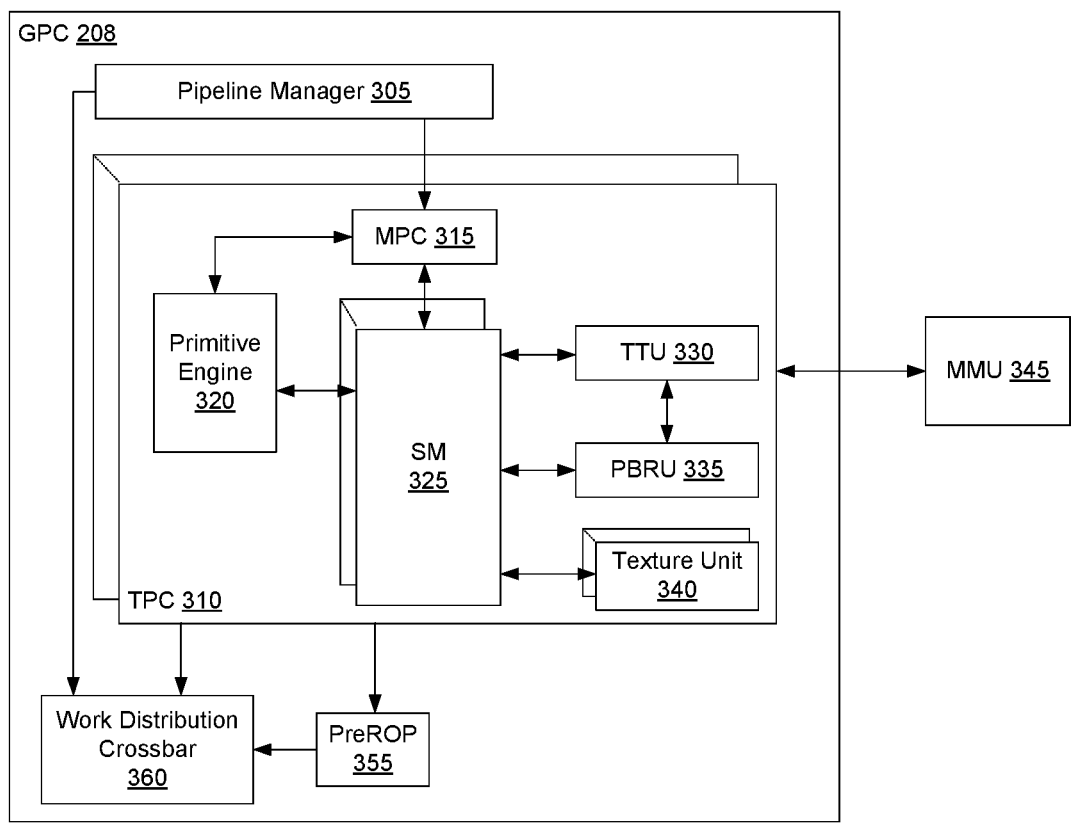
FIG. 3 is a block diagram of a general processing cluster of the parallel processing unit of FIG. 2, according to one embodiment.

FIG. 3 is a block diagram of a GPC 208 included in PPU 202 of FIG. 2, according to one embodiment. As shown in FIG. 3, each GPC 208 includes a number of hardware units for processing tasks. In one embodiment, each GPC 208 includes a pipeline manager 305, one or more texture processing clusters (TPCs) 310, a memory management unit (MMU) 345, a pre-raster operations unit (PreROP) 355, and a work distribution crossbar 360. It will be appreciated that the GPC 208 of FIG. 3 may include other hardware units in lieu of or in addition to the units shown in FIG. 3.

In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled by the pipeline manager 305. The pipeline manager 305 manages the configuration of the one or more TPCs 310 for processing tasks allocated to the GPC 208. The pipeline manager 305 may also be configured to route data received from a work distribution unit (not shown) within task/work unit 207 to appropriate logical units within the GPC 208, such as to one or more TPCs 310 for processing by a primitive engine 320 or an SM 325. Pipeline manager 305 may also be configured to control a work distribution crossbar 360 by specifying destinations processed data output by the TPCs 310.

Each TPC 310 includes an M-pipe controller (MPC) 315, a primitive engine 320, one or more streaming multiprocessors (SMs) 325, a tree traversal unit (TTU) 330, a rendering engine (PBRU) 335, and one or more texture units 340.

The MPC 315 controls the operation of the TPC 310, routing data received from the pipeline manager 305 to the appropriate units in the TPC 310. For example, data associated with a vertex may be routed to the primitive engine 320, which is configured to fetch vertex attributes associated with the vertex from the memory 204. In contrast, data associated with a shader program may be transmitted to an SM 325.

The SMs 325 comprise one or more programmable streaming processors that are configured to process tasks represented by a number of threads. Each SM 325 is multi-threaded and configured to execute a plurality of threads (e.g., 32 threads) from a particular group of threads concurrently. In one embodiment, the SM 325 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 325 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction.

Additionally, each SM 325 includes a set of functional execution units (not shown in FIG. 3), such as execution units and load-store units. Processing operations specific to any of the functional execution units may be pipelined, which enables a new instruction to be issued for execution before a previous instruction has completed execution. Any combination of functional execution units within a given SM 325 may be provided. In various embodiments, the functional execution units may be configured to support a variety of different operations including integer and floating-point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions). Advantageously, the same functional execution unit can be configured to perform different operations.

Although not shown in FIG. 3, each SM 325 contains a level one (L1) cache or uses space in a corresponding L1 cache outside of the SM 325 to support, among other things, load and store operations performed by the execution units. Each SM 325 also has access to level two (L2) caches (not shown) that are shared among all GPCs 208 in PPU 202. The L2 caches may be used to transfer data between threads. Finally, SMs 325 also have access to off-chip "global" memory, which may include PP memory 204 and/or system memory 104. It is to be understood that any memory external to PPU 202 may be used as global memory. Additionally, a level one-point-five (L1.5) cache (not shown) may be included within GPC 208 and configured to receive and hold data requested from memory via memory interface 214 by SM 325. Such data may include, without limitation, instructions, uniform data, and constant data. In embodiments having multiple SMs 325 within GPC 208, the SMs 325 may beneficially share common instructions and data cached in the L1.5 cache.

As shown in FIG. 3, the SMs 325 are coupled to a tree traversal unit (TTU) 330, a rendering engine (PBRU) 335, and one or more texture units 340. In some embodiments, one or more of TTU 330, PBRU 335, or texture units 340 may be included in an SM 325 or implemented within PPU 202 and shared by one or more GPCs 208 or by one or more SMs 325.

In some embodiments, the TTU 330 is configured to perform tree traversal operations. Tree traversal operations may be utilized in, for example, ray tracing algorithms in computer graphics. However, the TTU 330 may be optimized for general tree traversal operations and are not limited, specifically, to ray tracing techniques.

A tree traversal operation may include any operation performed by traversing the nodes of a tree data structure. A tree data structure may include, but is not limited to, a binary tree, an octree, a four-ary tree, a k-d tree, a binary space partitioning (BSP) tree, and a bounding volume hierarchy (BVH) tree. In one embodiment, the tree traversal operation includes a number of instructions for intersection a query shape with the tree. The query shapes may be, e.g., rays, bounding boxes, frustrums, cones, spheres, and the like. In various embodiments, a query shape may be specified by a query data structure. The query data structure may include any technically feasible technique for specifying the query shape to intersect with the tree. For example, the query data structure may specify the starting and ending points of a ray using two three-coordinate vectors. In another example, the query data structure may specify the six planes of an axis-aligned bounding box using six 32-bit floating point coordinates. The various query data structures may include any number of fields for specifying the attributes of the query shape.

One type of tree traversal operation for which the TTU 330 may be optimized is to intersect a ray with a BVH data structure that represents each of the geometric primitives representing objects in a 3D scene or 3D model. The TTU 330 may be particularly useful in ray-tracing applications in which millions or even billions of rays are intersected with the geometric primitives of a 3D model represented by a BVH data structure.

In some embodiments, the PBRU 335 is a rendering engine that is configured to perform ray tracing operations and other serial processing tasks in parallel. Serial processing tasks are tasks that typically involve different inputs and different computations, and therefore, cannot be processed in parallel by the SMs 325. As described in further detail below, the PBRU 335 includes a plurality of MIMD (multiple input, multiple data) processing cores, where each processing core is configured to asynchronously process a different ray or other unit of serial processing work. Thus, the plurality of processing cores can process a plurality of rays or other set of serial processing tasks largely in parallel. As shown in FIG. 3, the PBRU 335 is coupled to both the SMs 325 and the TTU 330. The SMs 325 and/or the TTU 330 offload ray processing or other serial processing tasks to the PBRU 335 for more efficient execution by the PBRU 335.

As an example, one type of ray tracing operation that the PBRU 335 may be optimized to perform is material shading. After the location of an intersection between a ray and an object in a 3D scene is identified, material shading is performed to determine a color corresponding to the surface of the object at the intersection location. Material shading calculations are based on a plurality of different material properties that are defined for the surface of the object. Thus, different material shading calculations may be performed for different surfaces with different material properties. As another example, a second type of ray tracing operation that the PBRU 335 may be optimized to perform is importance sampling. Importance sampling is performed to determine a direction of a secondary ray that is produced when a ray intersects with the surface of an object in a 3D scene. Similar to material shading, importance sampling calculations are based on a plurality of different material properties that are defined for the surface of the object, and different importance sampling calculations may be performed for different surfaces with different material properties. Accordingly, the PBRU 335 may be particularly useful for material shading and importance sampling applications where the intersection of millions or billions of rays with objects in a 3D scene are being evaluated to generate corresponding colors and directions, respectively.

In some embodiments, the texture units 340 are configured to load texture maps (e.g., a 2D array of texels) from the memory 204 and sample the texture maps to produce sampled texture values for use in shader programs executed by the SMs 325. The texture units 340 implement texture operations such as filtering operations using mip-maps (i.e., texture maps of varying levels of detail). In one embodiment, each TPC 310 includes two (2) texture units 340.

Each TPC 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data generated by the TPCs, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as TPCs 310, SMs 325, TTU 330, PBRU 335, texture units 340, or preROP units 355, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Figure 4:
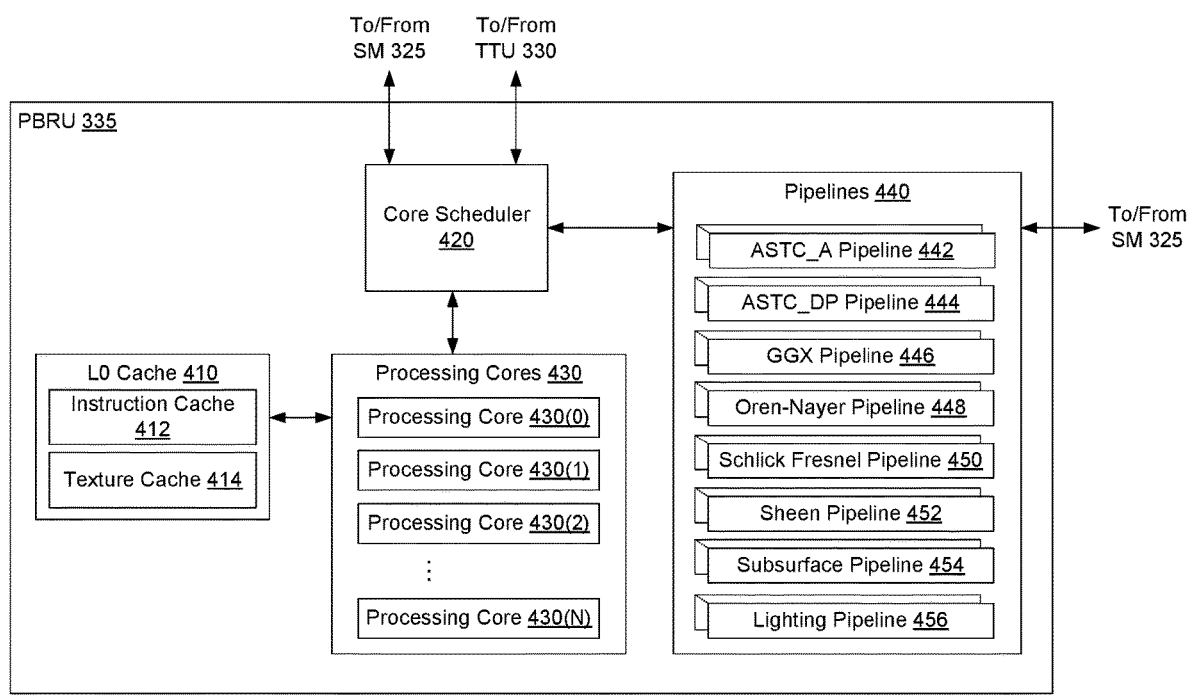
FIG. 4 is a block diagram of a rendering engine included in the texture processing unit of FIG. 3, according to one embodiment.

FIG. 4 is a block diagram of a PBRU 335 included in TPC 310 of FIG. 3, according to one embodiment. PBRU 335 is a MIMD rendering engine designed to perform ray tracing operations and other serial processing tasks in parallel. As shown in FIG. 4, PBRU 335 includes a L0 cache 410, a core scheduler 420, a plurality of processing cores 430, and a plurality of pipelines 440.

Core scheduler 420 is configured to, among other things, receive data from the SMs 325 and TTU 330; assign tasks to the processing cores 430; send data associated with the assigned tasks to the processing cores 430; receive requests from the processing cores 430; schedule and distribute requests from the processing cores 430 to appropriate units, such as to the pipelines 440 and to the L1 cache(s) of the SMs 325; receive processed data from the processing cores 430; and transmit processed data to the SMs 325 and TTU 330.

In some embodiments, core scheduler 420 receives a plurality of rays from the SMs 325 and/or TTU 330. Each ray represents a path extending from a light source towards a direction within a 3D scene or 3D environment. Additionally, for each ray, core scheduler 420 receives a set of instructions, or an address corresponding to the set of instructions, corresponding to ray tracing operations to be performed on the ray. For example, core scheduler 420 may receive a ray and a set of material shading instructions that correspond to a surface of an object within the 3D scene or environment that the ray intersects. The material shading instructions are based on one or more material properties associated with the surface of the object and, when executed, generate a color associated with the intersection of the ray with the surface of the object. As another example, core scheduler 420 may receive a ray and a set of importance sampling instructions that correspond to a surface of an object, within the 3D scene or environment, that the ray intersects. The importance sampling instructions are also based on one or more material properties associated with the surface of the object and, when executed, generate a direction for a secondary ray produced by the intersection of the ray with the surface of the object.

The core scheduler 420 assigns each ray to a different processing core 430 of the plurality of processing cores 430. The processing cores 430 comprise a plurality of MIMD processing cores. Each processing core 430 operates autonomously from the other processing cores 430. The processing cores 430 each execute the set of instructions for their assigned rays to generate a corresponding set of one or more results.

Each processing core 430 transmits its set of results to the core scheduler 420. The core scheduler 420 receives the different sets of results from the processing cores 430 and sends the different sets of results back to the SMs 325 and/or TTU 330 for further processing. As an example, a processing core 430 may execute a set of material shading instructions to generate a color corresponding to a ray. The processing core 430 transmits the ray and the color to core scheduler 420, and the core scheduler 420 transmits the ray and the color to the SMs 325 and/or TTU 330.

The processing cores 430 access a L0 cache 410. As shown in FIG. 4, L0 cache 410 includes instruction cache 412 and texture cache 414. Instruction cache 412 stores instructions that are being executed by the processing cores 430. Each processing core 430 receives a respective set of instructions to execute and caches the respective set of instructions in instruction cache 412. In some embodiments, each set of instructions is a fixed size, such as 32 bytes. Additionally, a set of instructions may be a subset of a larger set of instructions to be executed by a processing core 430.

After a processing core 430 finishes executing a set of instructions, processing core 430 requests the next set of instructions included in the larger set of instructions. In some embodiments, processing core 430 sends a request to core scheduler 420. Core scheduler 420 requests the next set of instructions from an L1 cache of an SM 325. The SM 325 transmits the requested set of instructions to core scheduler 420. In some embodiments, when the core scheduler 420 receives the requested set of instructions, core scheduler 420 sends the requested set of instructions to the processing core 430. In some embodiments, core scheduler 420 stores the requested set of instructions in instruction cache 412 and notifies processing core 430 that the requested set of instructions is available in instruction cache 412.

Texture cache 414 stores texture blocks that are used by the processing cores 430 while executing instructions. A texture block comprises an array of texture pixels (texels) containing color data that can be applied to surfaces of 3D objects. In some embodiments, the texture blocks comprise compressed texture blocks generated using one or more texture compression techniques. While executing a set of instructions, processing core 430 may load a compressed texture block, cache the compressed texture block in texture cache 414, and extract or decode one or more texels from the compressed texture block. The cached texture block can be accessed by other processing cores 430 that require the same texture block.

In some embodiments, if a processing core 430 requires a texture block that is not in L0 cache 410, then the processing core 430 sends a request to core scheduler 420. Core scheduler 420 requests the texture block from an L1 cache of an SM 325. The SM 325 transmits the requested texture block to core scheduler 420. In some embodiments, when the core scheduler 420 receives the requested texture block, core scheduler 420 sends the requested texture block to the processing core 430. In some embodiments, core scheduler 420 stores the requested texture block to texture cache 414 and notifies processing core 430 that the requested texture block is available in texture cache 414.

When a processing core 430 sends a request for a texture block or a set of instructions, the texture block or the set of instructions may not be in the L1 cache of the SM 325, i.e., a cache miss. If the requested texture block or set of instructions is not in the L1 cache, then processing core 430 may wait a long time, e.g., hundreds of clock cycles, for the requested texture block or set of instructions to be sent back. In some embodiments, after waiting a threshold number of clock cycles, the processing core 430 issues itself a ray stop instruction. In some embodiments, core scheduler 420 detects that a cache miss occurred, or is notified by SM 325 that a cache miss occurred, and issues a ray stop instruction to the processing core 430. In response to receiving a ray stop instruction, processing core 430 stops processing the ray and sends the ray to the core scheduler 420.

In some embodiments, sending the ray includes sending the address of the latest set of instructions executed by the processing core 430, an index within the latest set of instructions of the last instruction executed by the processing core 430, and the stack associated with the ray. Core scheduler 420 sends the ray to TTU 330. In some embodiments, TTU 330 stores a temporary array of rays. TTU 330 receives the ray and stores the ray in the temporary array. When the requested data is available in the L1 cache of SM 325, TTU 330 sends the ray back to PBRU 335. Since the ray includes the address of the latest set of instructions executed for the ray, the index of the last executed instruction, and the stack, when the ray is sent back to the PBRU 335 and assigned to a processing core 430, the processing core 430 can resume executing the latest set of instructions at the location indicated by the index. Thus, the processing core 430 can be assigned another ray to work on while waiting for the requested data, and retry the request for the next set of instructions or the texture block after the next set of instructions or the texture block becomes available.

The processing cores 430 share access to a plurality of pipelines 440. Each pipeline 440 is a CISC (complex instruction set computer) pipeline that corresponds to a specific fixed-function. Each pipeline 440 is configured to receive input associated with the corresponding fixed-function and execute the corresponding fixed-function on the input to generate corresponding output. In some embodiments, each fixed-function is a function related to evaluating a material graph, such as determining the address of a texture block, extracting a texel from a texture block, or performing a calculation such as reflectance, specular reflection, sheen, and the like.

As shown in FIG. 4, pipelines 440 includes one or more ASTC_A (address) pipelines 442, one or more ASTC_DP (data path) pipelines 444, one or more GGX pipelines 446, one or more Oren-Nayar pipelines 448, one or more Schlick Fresnel pipelines 450, one or more sheen pipelines 452, one or more subsurface pipelines 454, and one or more cell-based lighting pipelines 456. Although particular types of fixed-function pipelines are illustrated in FIG. 4, pipelines 440 may include any number and/or types of pipelines that correspond to any type of fixed-functions.

In some embodiments, a fixed-function corresponds to a plurality of pipelines 440, including one or more first pipelines 440 that execute the fixed-function to generate one or more outputs for material shading, e.g., a color, and one or more second pipelines 440 that execute the fixed-function to generate one or more outputs for importance sampling, e.g., a direction of a secondary ray.

During execution of a set of instructions, a processing core 430 determines that an instruction corresponds to a fixed-function associated with a pipeline 440 and sends a request to the corresponding pipeline 440 to execute the instruction. In some embodiments, sending the request to the corresponding pipeline 440 includes sending one or more inputs for the fixed-function to the corresponding pipeline 440. The processing core 430 pops one or more inputs for the fixed-function off of its stack and sends the one or more inputs and the request for the corresponding pipeline 440 to the core scheduler 420. Core scheduler 420 sends the request and the one or more inputs to the pipeline 440. The pipeline 440 generates one or more outputs based on the one or more inputs, and sends the one or more outputs to core scheduler 420. Core scheduler 420 determines that the one or more outputs are associated with the processing core 430 that sent the request, and sends the one or more outputs back to the processing core 430. The processing core 430 pushes the one or more outputs onto the top of its stack and proceeds with the next instruction in its set of instructions.

As an example, a processing core 430 may execute a set of instructions that includes an instruction to determine the address of a texture block. Processing core 430 determines that the instruction to determine the address of a texture block corresponds to an ASTC_A pipeline 442. In response to determining that the instruction corresponds to the ASTC_A pipeline 442, processing core 430 sends one or more inputs associated with determining the address of a texture block to the core scheduler 420, which sends the one or more inputs to the ASTC_A pipeline 442. The ASTC_A pipeline 442 generates, based on the one or more inputs, the address of the texture block and sends the address of the texture block to core scheduler 420. Core scheduler 420 receives the address from ASTC_A pipeline 442, determines that the address is associated with the processing core 430 that sent the request for ASTC_A pipeline 442 and sends the address to the processing core 430. The processing core 430 pushes the address of the texture block onto its stack.

In some embodiments, the pipelines 440 are also configured to receive requests directly from the SMs 325. While executing its own set of instructions, an SM 325 may determine than an instruction can utilize one of the pipelines 440. The SM 325 sends one or more inputs for the fixed-function corresponding to the pipeline 440 to the pipeline 440 for executing synchronously. The pipeline 440 generates one or more outputs based on the one or more inputs and sends the one or more outputs to the SM 325. In some embodiments, the pipeline 440 sends the one or more outputs directly to the SM 325 that sent the request. In some embodiments, the pipeline 440 sends the one or more outputs to the core scheduler 420. The core scheduler 420 determines that the one or more outputs are associated with the SM 325 and transmit the one or more outputs to the SM 325.

In some embodiments, core scheduler 420 receives a plurality of requests for the pipelines 440 from the plurality of processing cores 430. Core scheduler 420 determines when the request from each processing core 430 can be sent to the appropriate pipeline 440. In some embodiments, core scheduler 420 sends one request every clock cycle to each pipeline 440, e.g., each of the one or more ASTC_A pipelines 442, the one or more ASTC_DP pipelines 444, the one or more GGX pipelines 446, the one or more Oren-Nayar pipelines 448, the one or more Schlick Fresnel pipelines 450, the one or more sheen pipelines 452, the one or more subsurface pipelines 454, and the one or more cell-based lighting pipelines 456. Core scheduler 420 may implement any technically feasible means for selecting a particular request to transmit to a pipeline 440, such as a round-robin scheduling algorithm.

In some embodiments, requests from the SMs 325 for the pipeline 440 are prioritized over requests from the processing cores 430. When an SM 325 transmits a request to a pipeline 440, core scheduler 420 is notified that the pipeline 440 has received a request from the SM 325. In response to receiving the notification, core scheduler 420 does not send a request from a processing core 430 to the pipeline 440 that clock cycle.

Although embodiments are described herein with reference to material shading and importance sampling operations, the PBRU 335 may be used to perform other ray tracing operations and/or other types of serial processing tasks. Additionally, although embodiments are described herein with reference to sending and receiving rays, any type of technically feasible data may be transmitted between the PBRU 335, SMs 325, and TTU 330, and between the elements of the PBRU 335.

Material Shading Using a Rendering Engine

When rendering a two-dimensional image of a 3D scene, a plurality of rays are generated that originate from a particular light source and extend towards different directions in the 3D scene. For each ray, an intersection point between the ray and a surface of an object in the 3D scene is identified. Material shading is performed at the intersection point to determine a color corresponding to the surface of the object at the intersection point. The color produced by material shading represents a color of the object surface when hit by light from the light source, e.g., a beam of light represented by the ray.

An object surface is modeled using different layers of material properties, such as polish, reflectivity, diffuse behavior, translucency, transparency, and the like, that indicate how light interacts with the surface of the object. Each material property is defined using one or more calculations and/or functions that are evaluated based on one or more variables and/or one or more values that are produced by one or more other material properties.

A material graph can be used to represent the different material properties associated with the object surface and relationships between the different material properties. When performing material shading, the calculations and/or functions of the different material properties are evaluated based on the properties of the ray, such as the direction of arrival of the ray and the width of the ray at the intersection point, as well as the properties of the surface of the object, such as the surface normal, the shading normal, the normalized tangent, and/or the UV coordinates corresponding to the intersection point. As described in greater detail below in FIGS. 14-16, to evaluate the material graph using PBRU 335, the material graph is compiled into a set of material shading instructions that can be executed by PBRU 335.

Figure 5A:
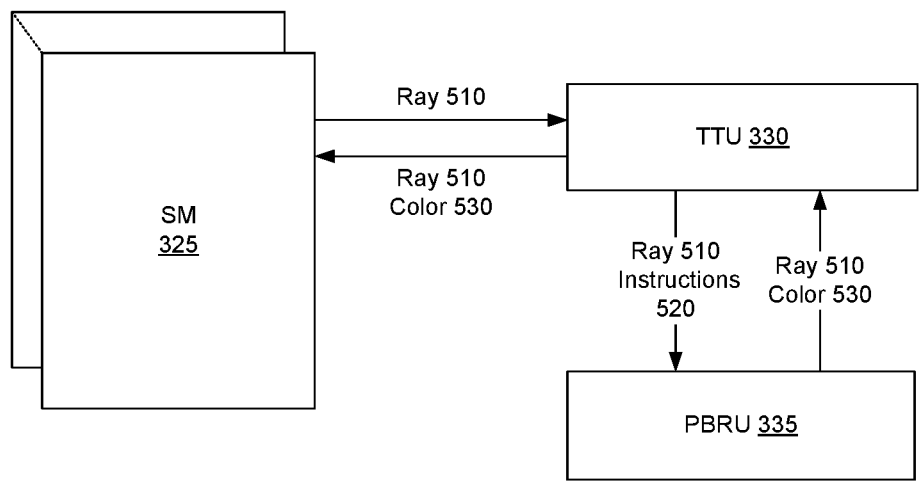
FIGS. 5A-B are block diagrams illustrating data flows for performing material shading of a ray using the rendering engine of FIG. 4, according to one embodiment.

FIG. 5A is a block diagram illustrating data flows for performing material shading of a ray using PBRU 335, according to one embodiment.

As shown in FIG. 5A, SM 325 sends a ray 510 to TTU 330 for processing. TTU 330 performs one or more tree traversal operations to determine an intersection point between the ray 510 and a surface of an object within a 3D scene.

TTU 330 sends the ray 510 to PBRU 335 for performing material shading for the ray 510. In some embodiments, ray 510 includes a ray identifier for identifying the ray 510. Typically, ray tracing involves identifying the intersection of hundreds, thousands, or even millions of rays with objects in the 3D scene. The ray identifier provides a way to track and identify the ray while it is being processed by TTU 330 and PBRU 335. In some embodiments, TTU 330 computes values for one or more variables associated with ray 510, such as one or more of the UV coordinates corresponding to the intersection point, the fraction of UV coverage at the intersection point, the normal vector of the object surface, the normal vector for shading the object surface, the direction of the ray 510, the direction of incoming light, and so forth. TTU 330 includes the one or more variable values when sending the ray 510 to PBRU 335. In some embodiments, values for one or more variables are computed by SM 325 and included in ray 510 when the ray 510 is sent from SM 325 to TTU 330. TTU 330 may include one or more of the variable values computed by SM 325 when sending the ray 510 to PBRU 335.

In some embodiments, TTU 330 determines, based on the intersection point, a set of material shading instructions 520 that correspond to the surface of the object at the intersection point. The set of material shading instructions 520 comprise byte code instructions that, when executed by PBRU 335, evaluate the different material properties defined in a material graph of the object surface to generate a color corresponding to the ray 510 and the intersection point. In some embodiments, the intersection point is associated with data indicating the material corresponding to the surface of the object at the intersection point and/or data indicating an address of the set of material shading instructions 520. TTU 330 determines the set of material shading instructions 520 based on the data associated with the intersection point.

In some embodiments, TTU 330 sends the set of material shading instructions 520, or a portion thereof, to PBRU 335 with the ray 510. In some embodiments, TTU 330 sends an address corresponding to the set of material shading instructions 520. Additionally, TTU 330 may send an index value indicating a location of the next instruction to execute within the set of material shading instructions 520. For example, TTU 330 may send an index value of 0 indicating that PBRU 335 should begin execution at the first instruction in the set of material shading instructions 520.

In some embodiments, sending the ray 510 includes sending a ray data structure corresponding to the ray 510. The ray data structure stores the ray identifier, the address of the set of material shading instructions 520, the index of the starting instruction within the set of material shading instructions 520, and a stack that includes the one or more variables associated with the ray.

PBRU 335 receives the ray 510 and the set of material shading instructions 520, and executes the set of material shading instructions 520 to generate a color 530 associated with the ray 510. As shown in FIG. 5A, PBRU 335 sends the ray 510 and color 530 to TTU 330 for further processing. In some embodiments, PBRU 335 stores the color 530 in the stack associated with the ray 510. Sending the ray 510 and the color 530 to TTU 330 includes sending the stack associated with the ray 510. TTU 330 can read the value of color 530 from the stack. In some embodiments, after receiving the ray 510 and color 530, TTU 330 sends the ray 510 and color 530 back to SM 325 for further processing.

Figure 5B:
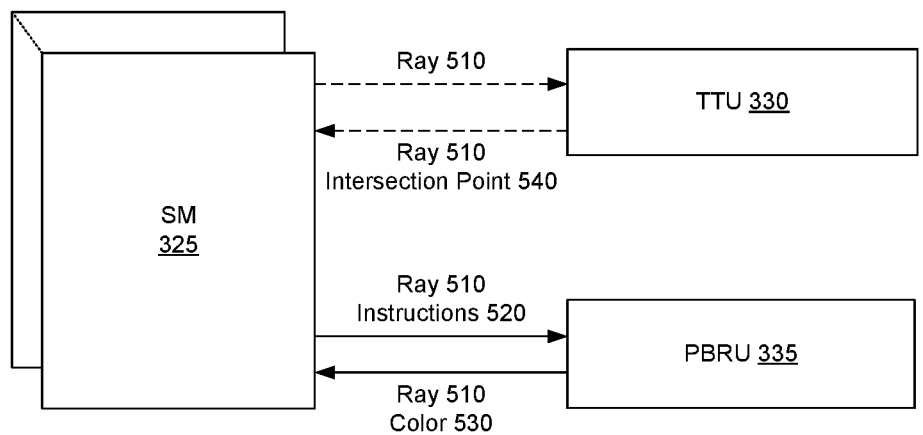

FIG. 5B is a block diagram illustrating data flows for performing material shading of a ray using the PBRU 335, according to one embodiment.

As shown in FIG. 5B, SM 325 sends a ray 510 to TTU 330 for processing. TTU 330 performs one or more tree traversal operations to determine an intersection point 540 between the ray 510 and a surface of an object within a 3D scene. Rather than sending the ray 510 to PBRU 335, TTU 330 sends the ray 510 and the intersection point 540 back to the SM 325. SM 325 then sends the ray 510 to PBRU 335 for performing material shading for the ray 510. In some embodiments, rather than sending the ray 510 to TTU 330 for processing, SM 325 performs one or more operations to determine the intersection point 540.

In some embodiments, the ray 510 includes a ray identifier for identifying the ray 510. In some embodiments, TTU 330 computes values for one or more variables associated with ray 510, such as one or more of the UV coordinates corresponding to the intersection point 540, the fraction of UV coverage at the intersection point 540, the normal vector of the object surface, the normal vector for shading the object surface, the direction of the ray 510, the direction of incoming light, and so forth. TTU 330 includes the one or more variable values when sending the ray 510 to SM 325, and SM 325 includes the one or more variable values when sending the ray 510 to PBRU 335. In some embodiments, SM 325 computes values for one or more variables associated with ray 510, either after determining the intersection point 540 or after receiving the ray 510 and intersection point 540 from TTU 330. SM 325 includes the one or more variable values when sending the ray 510 to PBRU 335.

In some embodiments, SM 325 determines, based on the intersection point 540, a set of material shading instructions 520 that correspond to the surface of the object at the intersection point 540. In some embodiments, SM 325 sends the set of material shading instructions 520, or a portion thereof, to PBRU 335 with the ray 510. In some embodiments, SM 325 sends an address corresponding to the set of material shading instructions 520. Additionally, SM 325 may send an index value indicating a location of the next instruction to execute within the set of material shading instructions 520. For example, SM 325 may send an index value of 0 indicating that PBRU 335 should begin execution at the first instruction in the set of material shading instructions 520.

In some embodiments, sending the ray 510 includes sending a ray data structure corresponding to the ray 510. The ray data structure stores the ray identifier, the address of the set of material shading instructions 520, the index of the starting instruction within the set of material shading instructions 520, and a stack that includes the one or more variables associated with the ray 510.

PBRU 335 receives ray 510 and the set of material shading instructions 520, and executes the set of material shading instructions 520 to generate a color 530 associated with the ray 510. As shown in FIG. 5B, PBRU 335 sends the ray 510 and color 530 to SM 325 for further processing. In some embodiments, PBRU 335 stores the color 530 in the stack associated with the ray 510. Sending the ray 510 and the color 530 to SM 325 includes sending the stack associated with the ray 510. SM 325 can read the value of color 530 from the stack.

It will be appreciated that the operations and data flows described herein are illustrative and that variations and modifications are possible. For example, either the SMs 325 or the TTU 330 may determine an intersection point between a ray and an object in a 3D scene, calculate variable values associated with the ray, determine a set of material shading instructions corresponding to the intersection point, transmit the ray to the PBRU 335, and/or transmit the set of material shading instructions to the PBRU 335. Similarly, the PBRU 335 may transmit one or more material shading results to either the SMs 325 or the TTU 330, irrespective of which one sent the ray to PBRU 335.

Figure 6:
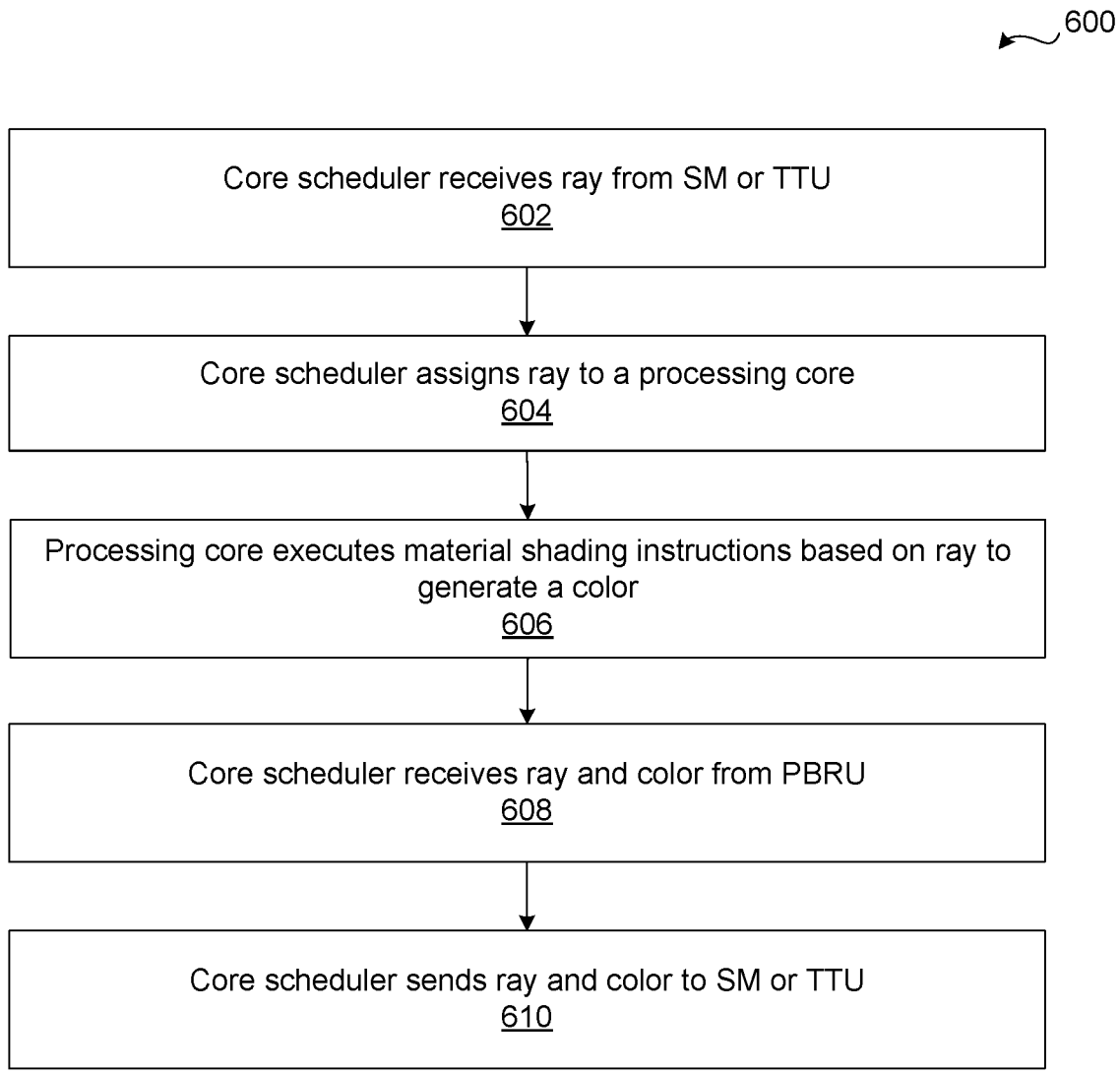
FIG. 6 is a flowchart of method steps for performing material shading for a ray using the rendering engine of FIG. 4, according to one embodiment.

FIG. 6 is a flowchart of method steps for performing material shading for a ray using a PBRU, according to one embodiment. Although the method steps are described in conjunction with the systems of FIGS. 1-4, persons skilled in the art will understand that any system configured to perform the method steps in any order falls within the scope of the present disclosure.

In step 602, a core scheduler of a PBRU receives a ray from an SM or a TTU. For example, core scheduler 420 receives a ray 510 from SM 325 or TTU 330. In some embodiments, core scheduler 420 also receives a set of material shading instructions from SM 325 or TTU 330. Core scheduler 420 stores the set of material shading instructions to the instruction cache 412. In some embodiments, core scheduler 420 receives an address corresponding to a set of material shading instructions from SM 325 or TTU 330.

In some embodiments, core scheduler 420 receives a ray data structure representing the ray 510. The ray data structure includes, for example, a ray identifier corresponding to ray 510, an address of a set of material shading instructions, an index of the starting instruction within the set of material shading instructions 520, and a stack that includes one or more variables associated with the ray 510.

In step 604, the core scheduler assigns the ray to a processing core. For example, core scheduler 420 assigns ray 510 to a particular processing core 430 of the plurality of processing cores 430. In some embodiments, core scheduler 420 determines which processing cores 430 do not have a ray assigned and selects a processing core 430 that does not currently have any rays assigned. In some embodiments, each processing core 430 can process a plurality of rays. Core scheduler 420 determines, for each processing core 430, a number of rays assigned to each core and selects a processing core 430 that has the lowest number of rays assigned.

In step 606, the processing core executes the set of material shading instructions based on the ray to generate a color. For example, processing core 430 executes the set of material shading instructions 520 based on the ray 510 to generate a color 530.

Figure 7:
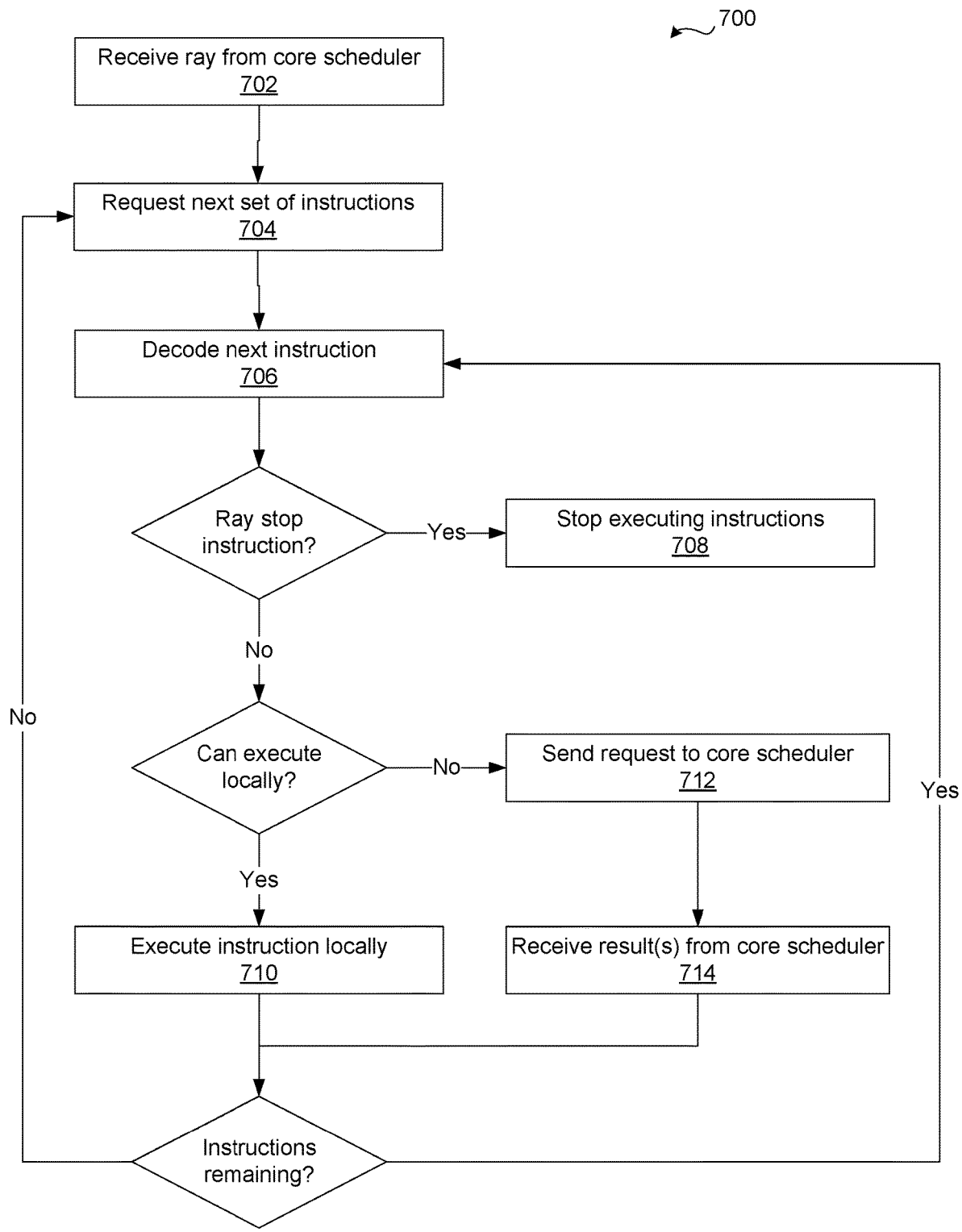
FIG. 7 is a flowchart of method steps for executing a set of material shading instructions using a rendering engine of FIG. 4, according to one embodiment.

FIG. 7 is a flowchart of method steps for executing a set of material shading instructions, according to one embodiment. Although the method steps are described in conjunction with the systems of FIGS. 1-4, persons skilled in the art will understand that any system configured to perform the method steps in any order falls within the scope of the present disclosure.

In step 702, a processing core of a PBRU receives a ray from a core scheduler. For example, processing core 430 receives ray 510 from core scheduler 420. In some embodiments, receiving ray 510 includes receiving a ray identifier corresponding to ray 510, an address corresponding to a set of material shading instructions 520, an index of a starting instruction within the set of material shading instructions, and a stack that includes the one or more variables associated with the ray 510.

In step 704, the processing core 430 requests a next set of material shading instructions. In some embodiments, the processing core 430 sends a request to the core scheduler 420 for a set of material shading instructions at the instruction address received with the ray 510. Core scheduler 420 receives the request and reads or retrieves the set of instructions from the L1 cache of SM 325 at the instruction address.

Processing core 430 waits to receive the set of material shading instructions from the core scheduler 420 or to receive an indication from core scheduler 420 that the set of material shading instructions are available in instruction cache 412. In some embodiments, a plurality of rays is assigned to processing core 430. Processing core 430 can begin processing a different ray while waiting to receive the set of material shading instructions or receive an indication that the set of material shading instructions are available. After receiving the next set of material shading instructions to execute or an receiving an indication that the next set of material shading instructions are in instruction cache 412, the method proceeds to step 706.

In some embodiments, if core scheduler 420 received a set of material shading instructions with ray 510, then core scheduler 420 stores the set of material shading instructions in instruction cache 412 or sends the set of material shading instructions to the processing core 430 with ray 510. Processing core 430 may determine that a next set of material shading instructions is available and proceed to step 706 without requesting any additional instructions.

In step 706, the processing core 430 decodes the next instruction in the set of material shading instructions. Additionally, processing core 430 decodes any immediates that follow the next instruction. In some embodiments, processing core 430 determines the next instruction in the set of material shading instructions based on an index value indicating the next instruction within the set of material shading instructions. Processing core 430 decodes the instruction at the location within the set of material shading instructions indicated by the index value. Processing core 430 performs one or more different actions depending on the next instruction.

If the next instruction is a ray stop instruction, then in step 708, the processing core stops executing material shading instructions for the ray and sends the ray to the core scheduler. For example, processing core 430 sends ray 510 to core scheduler 420. If processing core 430 generated a color 530, then processing core 430 also sends the color 530 to core scheduler 420.

In some embodiments, sending ray 510 to core scheduler 420 includes sending the stack for ray 510. If processing core 430 generated a color 530, then the color 530 is stored at the top of the stack for ray 510. If processing core 430 has not generated a color 530, then the stack reflects the computations that have been completed for ray 510.

In some embodiments, sending the ray 510 includes sending an updated ray data structure representing the ray 510. The updated ray data structure includes, for example, the ray identifier corresponding to ray 510; the address of the latest set of material shading instructions executed by processing core 430; the index of the last instruction, within the latest set of material shading instructions, that was executed by processing core 430; and the stack associated with ray 510.

If the next instruction is an instruction that can be executed locally by the processing core, then in step 710, the processing core executes the instruction locally, without involving the core scheduler. Instructions that can be executed locally include, for example, stack operations such as push, load, and store, and fixed-point arithmetic such as add, multiply, and lerp. After executing the instruction locally, the processing core proceeds to the next instruction, if available.

If the next instruction is not an instruction that can be executed locally by the processing core, then in step 712, the processing core sends a request to the core scheduler.

As an example, if the instruction corresponds to a fixed-function, such as texture address, texture data path, GGX, Oren-Nayar, Schlick-Fresnel, sheen, and so forth, then processing core 430 sends a request for the corresponding pipeline 440 to core scheduler 420. Sending the request to core scheduler 420 may include popping one or more arguments for the fixed-function off the stack and including the one or more arguments with the request. Core scheduler 420 sends the request and the one or more arguments to the corresponding pipeline 440. The pipeline 440 receives the one or more arguments as one or more inputs, and executes the corresponding fixed-function on the one or more inputs to generate one or more outputs of the fixed-function. The pipeline 440 transmits the one or more outputs back to core scheduler 420, and core scheduler 420 sends the one or more outputs to processing core 430.

As another example, if the instruction is to read a texture block, then processing core 430 sends a request to read the texture block to core scheduler 420. Sending the request to core scheduler 420 may include popping an address of the texture block off the stack and including the address of the texture block in the request. Core scheduler 420 requests the texture block from the L1 cache of SM 325 at the specified address. In some embodiments, core scheduler 420 sends the texture block to processing core 430. In some embodiments, core scheduler 420 caches the texture block in texture cache 414 and sends an indication to processing core 430 that the texture block is available in the L0 cache 410.

In some embodiments, sending the request includes sending an identifier corresponding to ray 510 with the request. In some embodiments, the identifier corresponding to ray 510 comprises the ray identifier corresponding to ray 510. In some embodiments, the identifier corresponding to ray 510 comprises an identifier corresponding to the processing core 430. If a plurality of rays is assigned to processing core 430, the identifier also comprises an index value that corresponds to an index of the ray 510 within the plurality of rays assigned to processing core 430. When the one or more outputs are transmitted to core scheduler 420, the identifier is included with the one or more outputs. Core scheduler 420 uses the identifier to determine that the one or more outputs should be sent to processing core 430.

After sending the request to core scheduler 420, processing core 430 waits until, at step 714, processing core 430 receives one or more results from core scheduler 420. In some embodiments, processing core 430 is assigned a plurality of rays. Processing core 430 can begin processing a different ray while waiting to receive the one or more results, and return to step 714 after receiving the one or more results from core scheduler 420. If the one or more results include one or more values, such as one or more values generated by a pipeline 440, then processing core 430 pushes the one or more values onto the stack. If the one or more results include a texture block, the processing core 430 caches the texture block in texture cache 414. After receiving the one or more results from core scheduler 420, processing core 430 proceeds to the next instruction, if available.

If there are no instructions remaining in the set of instructions but the processing core 430 has not reached a ray stop instruction and stopped executing instructions for the ray, then the method returns to step 704 where processing core 430 requests a next set of instructions to execute. Processing core 430 requests the next set of material shading instructions at the instruction address received with the ray 510, incremented by the index of the last instruction that was executed.

If there are instructions remaining in the set of instructions, then the method returns to step 706, where processing core 430 decodes the next instruction in the set of instructions. In some embodiments, the ray 510 includes an index value indicating the next instruction within the set of instructions, and the index value is incremented prior to returning to step 706.

Returning to FIG. 6, after the processing core finishes executing the set of material shading instructions, in step 608, core scheduler receives a ray and a color from the processing core. For example, core scheduler 420 receives ray 510 and color 530 from processing core 430. In some embodiments, core scheduler 420 receives a stack for ray 510 from processing core 430, where the color 530 is stored at the top of the stack. In some embodiments, core scheduler 420 receives an updated ray data structure, representing the ray 510, from processing core 430. The updated ray data structure includes, for example, the ray identifier corresponding to ray 510; the address of the latest set of material shading instructions executed by processing core 430; the index of the last instruction, within the latest set of material shading instructions, that was executed by processing core 430; and the stack associated with ray 510.

In step 610, the core scheduler sends the ray and the color to an SM and/or a TTU for further processing. For example, core scheduler 420 sends ray 510 and color 530 to SM 325 and/or TTU 330.

In some embodiments, processing core 430 stops executing instructions for ray 510 before a color 530 is generated. For example, as discussed in detail below, if a compiler determines that a function cannot be executed by the PBRU 335, the compiler may generate a set of instructions, corresponding to the function, that can be executed by an SM 325 and generates a ray stop instruction in the set of material shading instructions. When SM 325 receives the ray 510, SM 325 executes the set of instructions corresponding to the function. For example, SM 325 may execute a user-defined function based on the values stored in the stack of ray 510. In some embodiments, after SM 325 finishes executing the set of instructions corresponding to the function, SM 325 may push the results onto the stack of ray 510, increment the index value of the next instruction to execute, and send the ray 510 back to PBRU 335. Core scheduler 420 receives the ray 510 and assigns the ray 510 to a processing core 430 to continue execution.

In operation, core scheduler 420 receives a plurality of rays from SM 325 and/or TTU 330. Core scheduler 420 can receive a number of rays at the same time, and can also continue to receive additional rays over time. The steps discussed above in FIGS. 6 and 7 are repeated for each ray received by core scheduler 420. Thus, at any given time, each processing core of the plurality of processing cores 430 may be executing a respective set of material shading instructions for an assigned ray.

Utilizing Fixed-Function Pipelines

In some embodiments, in addition to sending tasks to the PBRU 335 for PBRU 335 to process asynchronously, an SM 325 can send synchronous requests directly to the pipelines 440 of PBRU 335. Each pipeline 440 corresponds to a specific fixed-function. Each fixed-function corresponds to a different byte code instruction executable by PBRU 335. Additionally, each fixed-function can correspond to a different instruction that is executable by the SM 325. When SM 325 executes an instruction corresponding to a pipeline 440, SM 325 can send a request to the pipeline 440. In some embodiments, sending the request includes reading one or more arguments for the fixed-function from a register of SM 325 and including the one or more arguments with the request. For example, if the SM 325 is performing an operation that requires computing sheen, SM 325 can send a request to a sheen pipeline 452 and have the sheen pipeline 452 perform the computation. The SM 325 waits for a result to be returned by the sheen pipeline 452. Sheen pipeline 452 processes the request from the SM 325 and sends the result back to the SM 325. The SM 325 receives the result and resumes the operation, utilizing the result received from sheen pipeline 452. In some embodiments, SM 325 is assigned a plurality of thread groups and SM 325 can switch to executing instructions for a different thread group while waiting for a result to be returned by a pipeline 440.

In some embodiments, requests from an SM 325 receive priority over requests from the processing cores 430 of the PBRU 335. A pipeline 440 receives and processes a request from the SM 325 prior to receiving and processing a request from a processing core 430. In some embodiments, if the SM 325 sends a request to a pipeline 440 and core scheduler 420 receives a request for the same pipeline 440 from a processing core 430, then core scheduler 420 waits before sending the request from the processing core 430 to the pipeline 440.

In some embodiments, the SMs 325 are coupled to a scheduler (not shown) that schedules requests from the SMs 325 to the pipelines 440. If multiple SMs 325 have a request for the same pipeline 440, the scheduler determines an order for the multiple SMs 325 to send a request to the pipeline 440.

Figure 8:
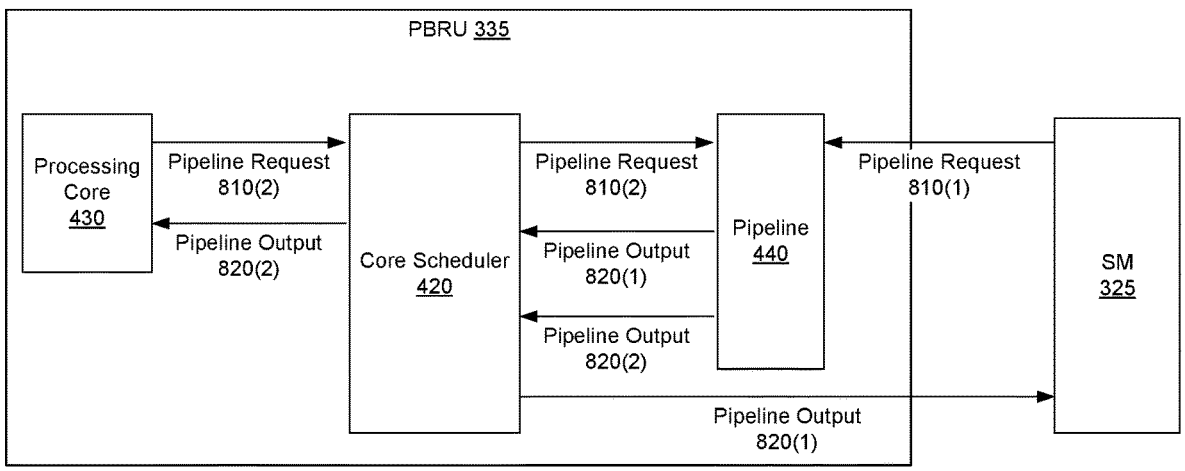
FIG. 8 is a block diagram illustrating data flows for using a fixed-function pipeline of the rendering engine of FIG. 4 to perform operations for a streaming multiprocessor, according to one embodiment.

FIG. 8 is a block diagram illustrating data flows for using a pipeline 440 to perform operations for an SM 325, according to one embodiment.

As shown in FIG. 8, an SM 325 sends a pipeline request 810(1) to a pipeline 440. The pipeline request 810(1) includes one or more inputs corresponding to a fixed-function implemented by pipeline 440.

Core scheduler 420 receives a pipeline request 810(2) from a processing core 430. The pipeline request 810(2) is also for the pipeline 440. The pipeline request 810(1) from SM 325 has priority over the pipeline request 810(2) from processing core 430.

In some embodiments, when SM 325 sends the pipeline request 810(1) to pipeline 440, core scheduler 420 is notified that the pipeline 440 has received a request from an SM 325. For example, the SM 325 and/or pipeline 440 may send a signal or other indication to core scheduler 420. As another example, core scheduler 420 may monitor the pipeline 440 to determine when pipeline 440 receives a request. In some embodiments, when the SM 325 sends a request to pipeline 440, SM 325 also sends a valid signal to the pipeline 440. Core scheduler 420 monitors the pipeline and if the valid signal is set to 1, then core scheduler 420 determines that a request was sent to the pipeline 440. In response to being notified that the pipeline 440 has received a request from SM 325, core scheduler 420 waits a pre-determined amount of time, e.g. one clock cycle, before sending the pipeline request 810(2) to the pipeline 440.

In some embodiments, if additional requests from SMs 325 are received by the pipeline 440, the additional requests also receive priority over the request from processing core 430. Core scheduler 420 continues to wait to send pipeline request 810(2) to the pipeline 440 until a clock cycle when no requests were sent by an SM 325 to the pipeline 440. In some embodiments, the SMs 325 can schedule pipeline requests so that requests from the processing cores 430 can be periodically sent to the pipeline 440. For example, the SMs 325 can wait a period of time between each request to a pipeline 440.

Pipeline 440 executes the fixed-function on the one or more inputs included with the pipeline request 810(1) to generate pipeline output 820(1). As shown in FIG. 8, pipeline 440 sends the pipeline output 820(1) to core scheduler 420. Core scheduler 420 determines that the pipeline output 820(1) is associated with the SM 325 and sends the pipeline output 820(1) to the SM 325. In some embodiments, each pipeline output includes or is associated with an identifier, such as a ray identifier, an identifier associated with a processing core 430, or an identifier associated with SM 325. Core scheduler 420 determines that pipeline output 820(1) is associated with the SM 325 based on the identifier included with or associated with pipeline output 820(1). For example, pipeline output that is associated with a processing core 430 may include or be associated with a ray identifier or an identifier corresponding to the processing core 430, while pipeline output that is associated with an SM 325 may include or be associated with an identifier that is not the same type or format as a ray identifier or processing core identifier, or may not include or be associated with any identifier at all.

In some embodiments, rather than sending pipeline output 820(1) to core scheduler 420, the pipeline 440 sends the pipeline output 820(1) back to SM 325 directly. In some embodiments, pipeline 440 writes the pipeline output 820(1) to a register file of the SM 325.

Pipeline 440 executes the fixed-function on the one or more inputs included with the pipeline request 810(2) to generate pipeline output 820(2). The pipeline 440 sends the pipeline output 820(2) to core scheduler 420. Core scheduler 420 determines that the pipeline output 820(2) is associated with the processing core 430, and sends the pipeline output 820(2) to processing core 430. In some embodiments, each pipeline output includes or is associated with an identifier, such as a ray identifier, an identifier associated with a processing core 430, or an identifier associated with SM 325. Core scheduler 420 determines that pipeline output 820(2) is associated with the processing core 430 based on the identifier included with or associated with pipeline output 820(2). For example, pipeline output 820(2) may include or be associated with a specific ray identifier, and core scheduler 420 determines that the ray corresponding to the specific ray identifier is assigned to the processing core 430. As another example, pipeline output 820(2) may include or be associated with a processing core identifier, and core scheduler 420 determines that the processing core identifier corresponds to the processing core 430.

Figure 9:
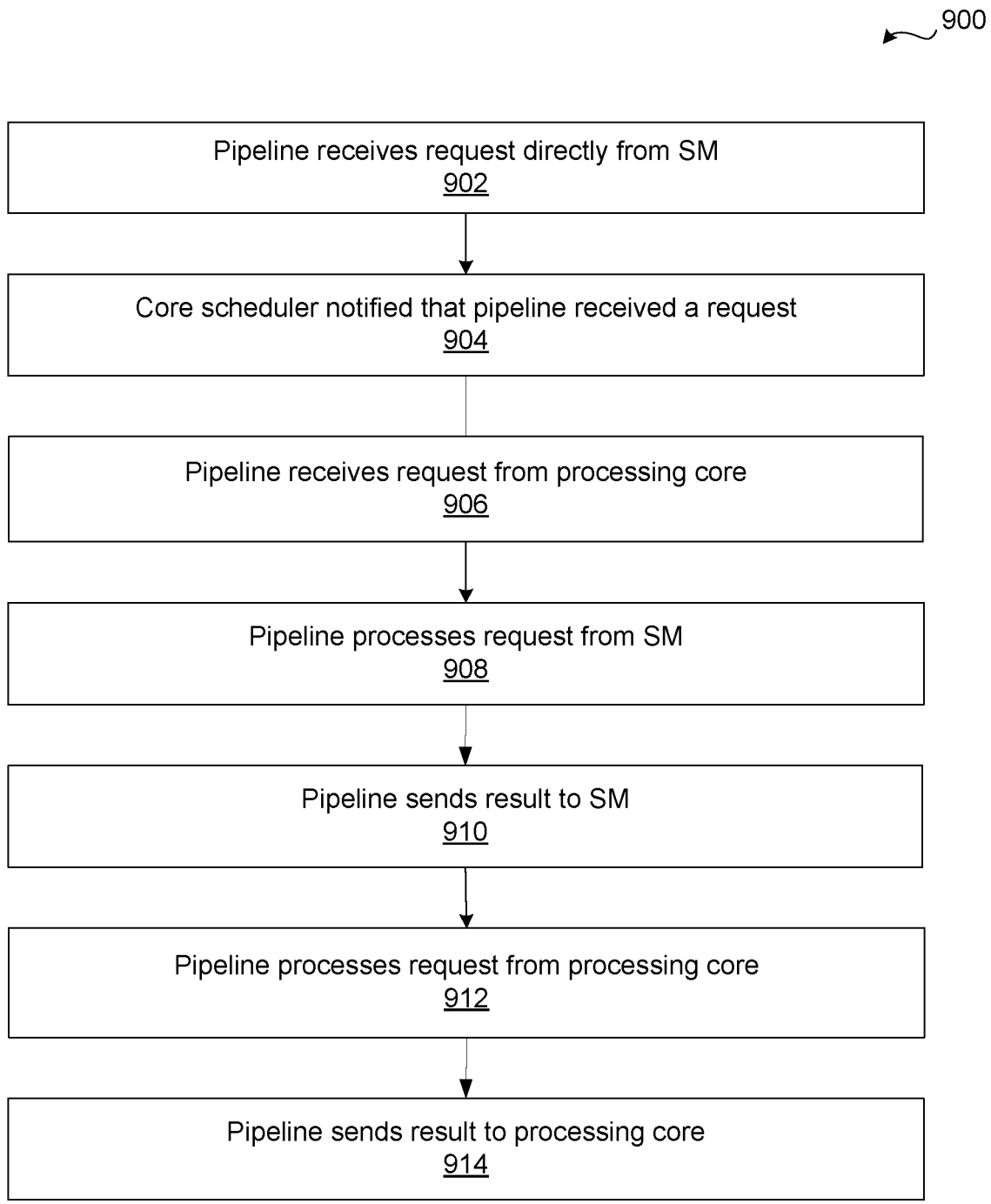
FIG. 9 is a flowchart of method steps for using a fixed-function pipeline of the rendering engine of FIG. 4 to perform operations for a streaming multiprocessor, according to one embodiment.

FIG. 9 is a flowchart of method steps for using a pipeline of the PBRU to perform operations for an SM, according to one embodiment. Although the method steps are described in conjunction with the systems of FIGS. 1-4, persons skilled in the art will understand that any system configured to perform the method steps in any order falls within the scope of the present disclosure.

In step 902, a pipeline 440 receives a request from an SM 325. The pipeline 440 corresponds to a specific fixed-function, and the request from the SM 325 includes one or more first inputs corresponding to the specific fixed-function.

In step 904, core scheduler 420 is notified that the pipeline 440 received a request from the SM 325. In some embodiments, the SM 325 and/or pipeline 440 sends a signal or other notification to core scheduler 420 to indicate that the pipeline 440 received a request from SM 325. In some embodiments, core scheduler 420 monitors the pipeline 440 to detect when pipeline 440 receives a request. In some embodiments, when the SM 325 sends a request to pipeline 440, the SM 325 also sends a valid signal to the pipeline 440. Core scheduler 420 monitors the pipeline and if the valid signal is set to 1, then core scheduler 420 determines that a request was sent to the pipeline 440. After determining that the pipeline 440 received a request from an SM 325, if core scheduler 420 receives a request for the same pipeline 440 from a processing core 430, then core scheduler 420 will wait to transmit the request to the pipeline 440.

In step 906, the pipeline 440 receives a request from a processing core 430. The request from the processing core 430 includes one or more second inputs corresponding to the fixed-function. In some embodiments, the request from the processing core 430 is received via core scheduler 420. As discussed above, core scheduler 420 receives the request from processing core 430 and determines when to send the request from the processing core 430 to the pipeline 440.

At step 908, the pipeline 440 processes the request from the SM 325 to generate a first set of one or more results. Processing the request from the SM 325 includes executing the fixed-function on the one or more first inputs included in the request from the SM 325.

At step 910, the pipeline 440 sends the first set of one or more results to the SM 325. In some embodiments, the pipeline 440 sends the first set of results to core scheduler 420. Core scheduler 420 determines that the first set of results are associated with the SM 325 and transmits the first set of results to the SM 325. In some embodiments, the pipeline 440 transmits the first set of results directly to the SM 325. In some embodiments, pipeline 440 writes the first set of results to a register file of the SM 325.

At step 912, the pipeline 440 processes the request from the processing core 430 to generate a second set of one or more results. Processing the request from the processing core 430 includes executing the fixed-function on the one or more second inputs included in the request from the processing core 430.

At step 914, the pipeline 440 sends the second set of one or more results to the processing core 430. In some embodiments, the pipeline 440 sends the second set of results to the core scheduler 420. The core scheduler 420 determines that the second set of results are associated with the processing core 430 and transmits the second set of results to the processing core 430. In some embodiments, the pipeline 440 transmits the second set of results directly to the processing core 430.

Extracting Single Texels from Texture Blocks

Evaluating the different material properties of an object surface include sampling textures defined for a material property and performing one or more calculations based on the sampled texture. The texture(s) for an object surface are stored as a plurality of texture blocks. Each texture block comprises an array of texels that contain color data that can be applied to the object surface. In some embodiments, each texture block corresponds to a specific mip level, where each mip level corresponds to a different size and resolution of the texture.

To reduce the amount of storage and memory space required for the plurality of texture blocks, each texture block is compressed using one or more texture compression techniques. In some embodiments, each texture block is compressed and stored using ASTC (Adaptive Scalable Texture Compression). The texture block is decompressed when values of texels contained in the texture block are required. Typically, execution units that are configured to load and process texture blocks, such as a texture unit 340, decompress an entire compressed texture block to obtain the values of the texels contained in the compressed texture block. However, since the operations performed by the PBRU 325, e.g., material shading, are based on a single intersection point, the operations typically only require values from a single texel.

Figure 10A:
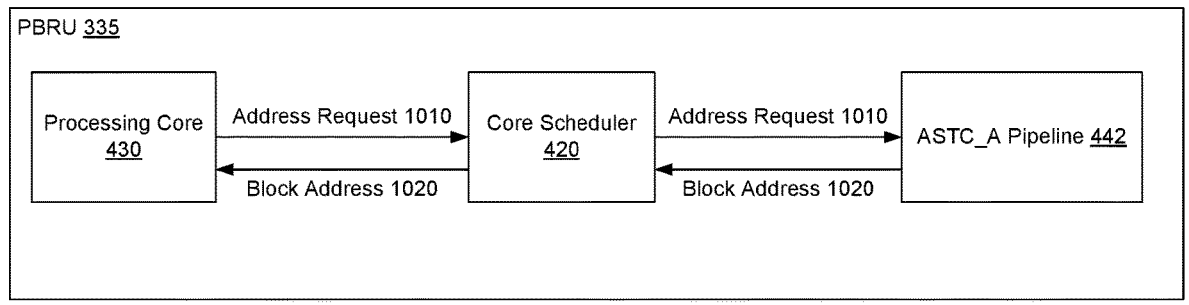
FIGS. 10A-C are block diagrams illustrating data flows for extracting a single texel from a compressed texture block using the rendering engine of FIG. 4, according to one embodiment.
Figure 10B:
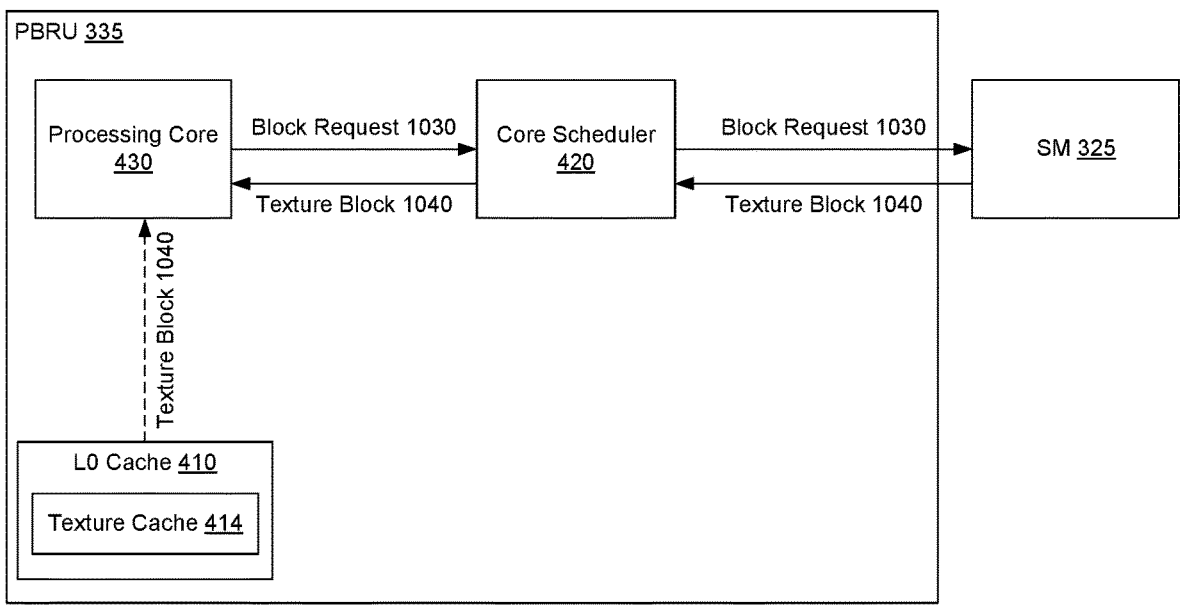
Figure 10C:
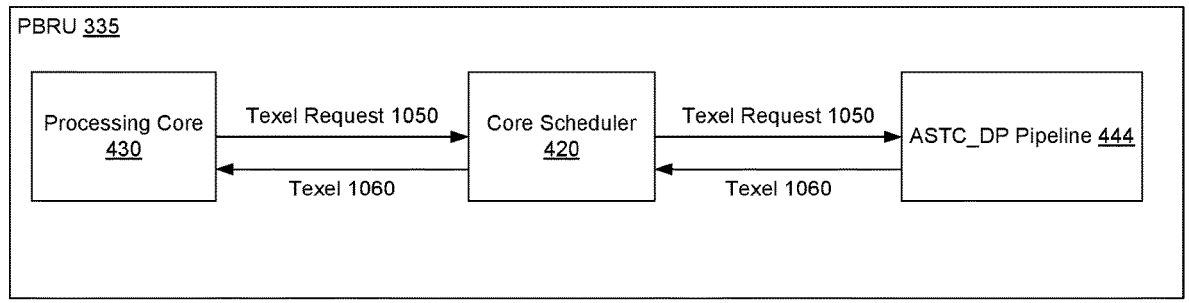

FIG. 10A-C are block diagrams illustrating data flows for extracting a single texel from a compressed texture block using the PBRU 335, according to one embodiment. Although examples are described herein with respect to compressed texture blocks in ASTC format, any compressed or uncompressed texture block format may be used. The specific steps for extracting a single texel may vary depending on the specific texture block format. Additionally, due to the minimum granularity of a read operation, one or more texels surrounding the single texel may be read, but the one or more texels can be discarded immediately after being read.

As shown in FIG. 10A, a processing core 430 sends an address request 1010 to the core scheduler 420. The processing core 430 sends the address request 1010 in response to executing a texture address instruction. In some embodiments, processing core 430 pops one or more values off of its stack and includes the one or more values in the address request 1010. The one or more values correspond to variables used when determining a texture block address and/or texel location, such as UV coordinates corresponding to the intersection point of the ray and the object surface and the fraction of UV coverage at the intersection point.

Core scheduler 420 sends the address request 1010 to a texture address pipeline, such as ASTC_A pipeline 442. ASTC_A pipeline 442 is configured to execute a fixed-function that determines a block address 1020 of a target texture block based on the one or more values included in address request 1010. In some embodiments, ASTC_A pipeline 442 is also configured to determine the coordinates, within the texture block, of a target texel, based on the one or more values included in address request 1010. In some embodiments, one or more other pipelines 440 are configured to determine the coordinates of the target texel.

ASTC_A pipeline 442 sends the block address 1020 to core scheduler 420. In some embodiments, ASTC_A pipeline 442 also sends the coordinates of the texel to core scheduler 420.

Core scheduler 420 receives the block address 1020 from ASTC_A pipeline 442. Additionally, core scheduler 420 may also receive the texel coordinates from ASTC_A pipeline 442. Core scheduler 420 determines that the block address 1020 and texel coordinates are associated with processing core 430, and sends the block address 1020 and texel coordinates to processing core 430. In some embodiments, after receiving the block address 1020 and the texel coordinates, processing core 430 pushes the block address 1020 and the texel coordinates onto its stack.

After the processing core 430 receives the block address 1020, processing core 430 proceeds with executing the next instruction in its assigned set of instructions. When processing core 430 executes a texture read instruction, processing core 430 sends a request for a texture block 1040 located at block address 1020.

If the texture block 1040 is cached in texture cache 414 of L0 cache 410, then processing core 430 skips the texture read instruction and proceeds with executing the next instruction in its assigned set of instructions.

If the texture block 1040 is not in texture cache 414, then processing core 430 requests the texture block 1040 from the L1 cache of SM 325. As shown in FIG. 10B, processing core 430 sends a block request 1030 to core scheduler 420. In some embodiments, when processing core 430 receives block address 1020, processing core 430 pushes the block address 1020 onto its stack. When executing the texture read instruction, processing core 430 pops the block address 1020 off of its stack and includes the block address 1020 with block request 1030.

Core scheduler 420 sends the block request 1030 and the block address 1020 to the SM 325. In response to receiving block request 1030, SM 325 sends the texture block 1040 stored at block address 1020 to core scheduler 420. Core scheduler 420 receives texture block 1040 and determines that texture block 1040 is associated with the processing core 430. As shown in FIG. 10B, core scheduler 420 sends the texture block 1040 to the processing core 430. Processing core 430 stores texture block 1040 in texture cache 414 of the L0 cache 410, and then proceeds with executing the next instruction in its assigned set of instructions. In some embodiments, core scheduler 420 stores texture block 1040 in texture cache 414 and notifies processing core 430 that texture block 1040 is available in texture cache 414. Processing core 430 receives the notification and proceeds with executing the next instruction in its assigned set of instructions.

When processing core 430 executes a texture data path instruction, processing core 430 sends a request for a texel 1060 located at the texel coordinates (i.e., sub-coordinates) within texture block 1040. As shown in FIG. 10C, processing core 430 sends a texel request 1050 to the core scheduler 420. Processing core 430 reads texture block 1040 from texture cache 414 and includes texture block 1040 with the texel request 1050. Additionally, processing core 430 pops the coordinates of texel 1060 off its stack and includes the texel coordinates with the texel request 1050.

Core scheduler 420 sends the texel request 1050 to a texel extraction pipeline, such as ASTC_DP pipeline 444. ASTC_DP pipeline 444 is configured to execute a fixed-function that extract a decompressed texel 1060 from the texture block 1040 included in the texel request, based on the texel coordinates included in the texel request 1050.

The ASTC_DP pipeline 444 sends texel 1060 to core scheduler 420. In some embodiments, extracting texel 1060 includes extracting the decompressed RGBA (red, green, blue, and alpha) values corresponding to texel 1060. ASTC_DP 444 sends the RGBA values corresponding to texel 1060 to core scheduler 420.

Core scheduler 420 receives texel 1060 from ASTC_DP pipeline 444. In some embodiments, receiving texel 1060 includes receiving the RGBA values corresponding to texel 1060. Core scheduler 420 determines that texel 1060 is associated with processing core 430 and sends texel 1060 to processing core 430. In some embodiments, after receiving texel 1060, processing core 430 pushes texel 1060 onto its stack.

Figure 11A:
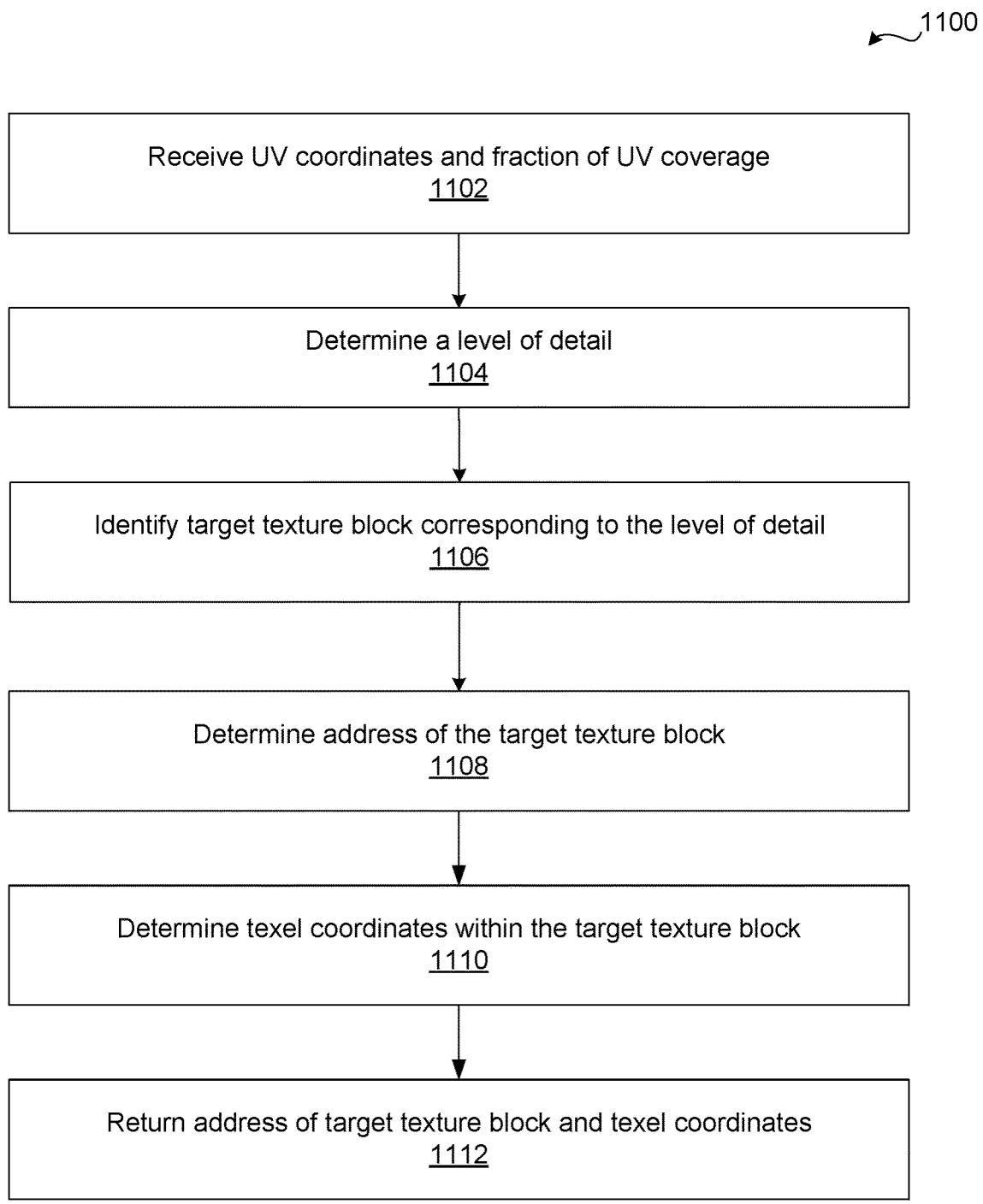
FIG. 11A is a flowchart of method steps for determining an address of a target texture block, according to one embodiment.

FIG. 11A is a flowchart of method steps for determining an address of a target texture block, according to one embodiment. Although the method steps are described in conjunction with the systems of FIGS. 1-4, persons skilled in the art will understand that any system configured to perform the method steps in any order falls within the scope of the present disclosure.

In step 1102, ASTC_A pipeline 442 receives a set of UV coordinates corresponding to an intersection point and the fraction of UV coverage at the intersection point. In some embodiments, ASTC_A pipeline 442 receives a value corresponding to the square root of the fraction of UV coverage, rather than a value corresponding to the fraction of UV coverage.

In some embodiments, ASTC_A pipeline 442 also receives one or more other variables that are needed to determine a texture block address, such as the starting address for a set of texture blocks corresponding to a texture, where each texture block in the set of texture blocks corresponds to a different mip level of the texture, and the dimensions of the texture.

In step 1104, ASTC_A pipeline 442 determines a level of detail corresponding to the intersection point. In some embodiments, ASTC_A pipeline 442 determines a level of detail based on the size of the ray at the intersection point. If the ray is narrow, then a higher level of detail is needed to provide more resolution to the texture. If the ray is wide, then it covers more of the texture, so a lower level of detailed is needed.

In step 1106, ASTC_A pipeline 442 identifies a target texture block corresponding to the level of detail. In some embodiments, determining a level of detail includes determining a target mip level. The target texture block is the texture block, within the set of texture blocks, that corresponds to the target mip level.

In step 1108, ASTC_A pipeline 442 determines an address of the target texture block. In some embodiments, determining the address of the target texture block is based on a starting address of the set of texture blocks that includes the target texture block. ASTC_A pipeline 442 computes an offset value based on the target mip level, and determines the address of the target texture block by applying the offset value to the starting address.

In step 1110, ASTC_A pipeline 442 determines the coordinates of a target texel within the target texture block. In some embodiments, ASTC_A pipeline 442 determines the coordinates of the target texel based on the UV coordinates corresponding to the intersection point and the target mip level. ASTC_A pipeline 442 modifies the UV coordinates, which are based on the size of the original texture, to generate modified UV coordinates that are based on the size of the texture block at the target mip level.

In some embodiments, the operation of ASTC_A pipeline 442 in determining the target texture block and the coordinates of the target texel, as described above with respect to steps 1104-1110, may be represented by the following pseudocode:

```
width_of_footprint=int
    (sqrt_fraction_uv_coverage*sqrt_texture_area);

mip_level=min(log 2(width_of_footprint),coarsest_
    mip_level);
```

```
mip_block_offset=offset of first block for chosen
    mip level;

modified_u=int(u*mip_xsize);

modified_v=int(v*mip_ysize);

bx=modified_u/block_dimension_x;

by=modified_v/block_dimension_y;

block_address=block_set_address+mip_block_offset+
    bx+by*mip_block_count_x;

texel_coord_x=modified_u−bx*block_dimension_x;

texel_coord_y=modified_v−by*block_dimension_y;
```

According to the above pseudocode, ASTC_A pipeline 442 computes a width of the footprint of the ray based on the fraction of UV coverage and the size of the texture. The target mip level is determined based on the size of the footprint. As shown in the above pseudocode, the selected mip level cannot be smaller than the coarsest mip level. A block address of the target texture block is determined based on the address of the set of blocks, the offset value corresponding to the mip level, the dimensions of the texture block at the target mip level, and the dimensions of the original texture. Additionally, ASTC_A pipeline 442 computes x and y coordinates of the target texel based on modified uv coordinates, the dimensions of the texture block at the target mip level, and the dimensions of the original texture.

In step 1112, ASTC_A pipeline 442 generates output comprising the address of the target texture block and the coordinates within the target texture block of the target texel.

Figure 11B:
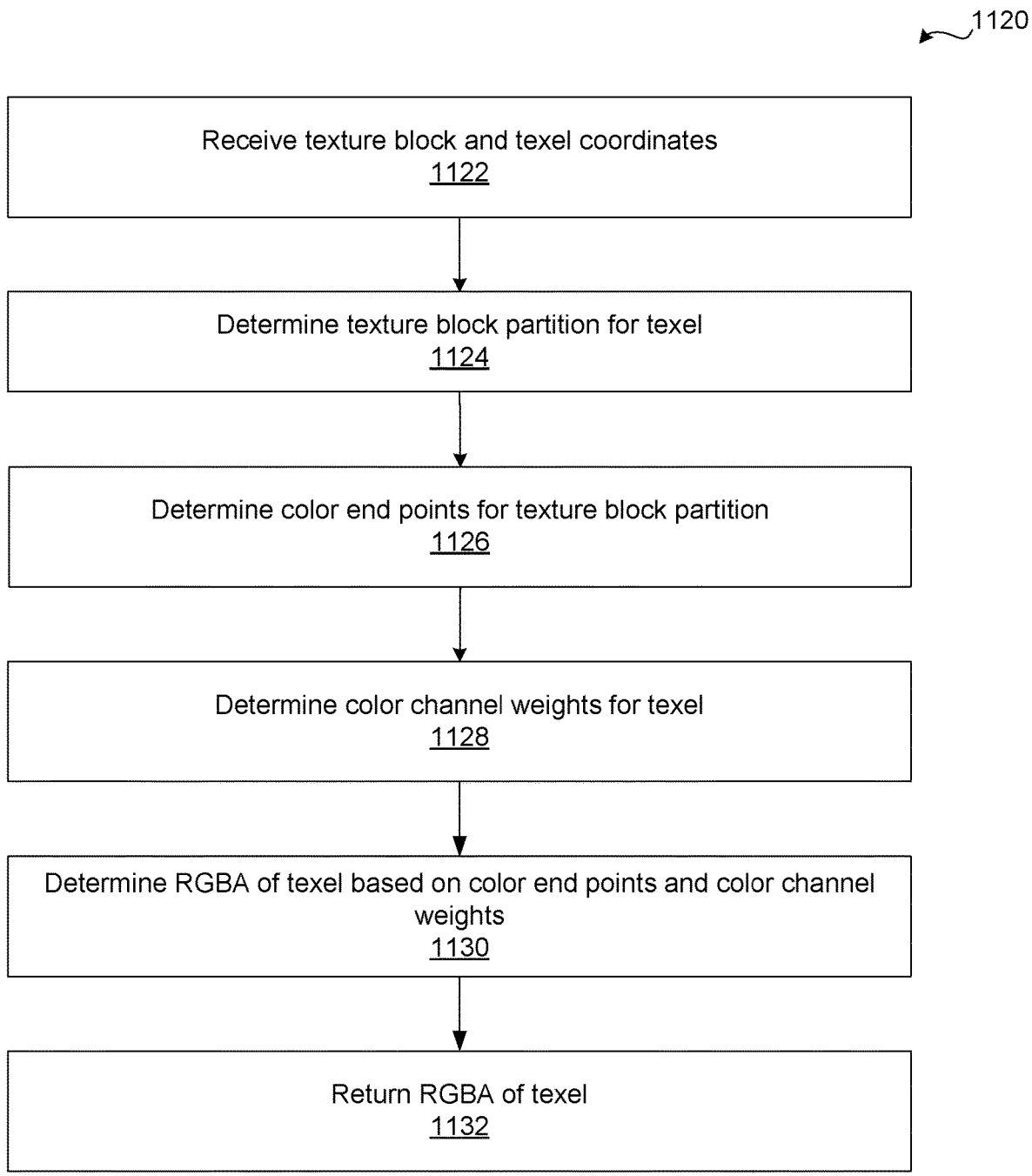
FIG. 11B is a flowchart of method steps for extracting a target texel from a texture block, without decompressing or extracting other texels in the texture block, according to one embodiment.

FIG. 11B is a flowchart of method steps for extracting a target texel from a texture block, without decompressing or extracting other texels in the texture block, according to one embodiment. Although the method steps are described in conjunction with the systems of FIGS. 1-4, persons skilled in the art will understand that any system configured to perform the method steps in any order falls within the scope of the present disclosure.

In step 1120, ASTC_DP pipeline 444 receives a texture block and a set of texel coordinates corresponding to a target texel. For example, ASTC_DP pipeline 444 receives texture block 1050 and texel coordinates from core scheduler 420.

In some embodiments, ASTC_DP pipeline 444 also receives header information for the texture block. In some embodiments, ASTC_DP pipeline 444 reads the texture block and extracts header information from the texture block. The header information includes metadata used to extract the target texel the texture block, such as the block mode, the locations of weights, the locations of partitions, the color endpoint mode, and so forth. The header information needed to extract the target texel from the texture block may vary depending on the particular texture block.

In some embodiments, if the block is marked as "void-extent" then the texture block stores a constant color. ASTC_DP pipeline 444 outputs the constant color stored in the block.

In step 1124, ASTC_DP pipeline 444 identifies a texture block partition within the texture block that corresponds to the target texel. In some embodiments, ASTC_DP pipeline 444 determines the texture block partition based on the coordinates of the target texel.

In step 1126, ASTC_DP pipeline 444 determines the color end points for the texture block partition. In some embodiments, ASTC_DP pipeline 444 determines a color endpoint mode corresponding to the partition based on the metadata included in the header information for the texture block. The metadata indicates the color endpoint mode used for the texture block. ASTC_DP pipeline 444 decodes the color endpoints for the texture block partition based on the color endpoint mode.

In step 1128, ASTC_DP pipeline 444 determines one or more color channel weights for the target texel. In some embodiments, determining the color channel weights is based on the metadata included in the header information for the texture block. The metadata indicates the location(s) within the texture block of the one or more color channel weights. Additionally, the metadata may include weight quantization metadata that indicates how to extract the one or more color channel weights from the texture block. ASTC_DP pipeline 444 extracts the one or more color channel weights from the indicated location(s) based on the weight quantization metadata.

In some embodiments, ASTC_DP pipeline 444 determines two color channel weights, and ASTC_DP pipeline 444 further determines which color channel (red, green, blue, or alpha) corresponds to which of the two color channel weights.

In step 1130, the RGBA values of the target texel are computed based on the color end points and the color channel weights. In some embodiments, the operation of ASTC_DP pipeline 444 in computing the RGBA values of the target texel may be represented by the following pseudocode:

```
foreach color channel c (RGBA):
    w=weights[c];
    C=endpoint_C0*(64−w)+endpoint_C1*w;
    if srgb_conversion then
        C=(C>>8) & 0xff;
        rgba[c]=srgb8_to_linear_gamma(C);
    else
        rgba[c]=(C==0xffff)?1.0: (float(C)/float(1<<16));
    end if
endfor
```

According to the above pseudocode, ASTC_DP pipeline 444 computes a value for each of the RGBA color channels. ASTC_DP pipeline 444 computes the value for each color channel based on the color channel weights and the color end points determined in steps 1126 and 1128 above. If sRGB is being used, then ASTC_DP pipeline 444 converts the values to RGBA. If ASTC_DP pipeline 444 is not performing an sRGB conversion, then ASTC_DP pipeline 444 converts a number between 0 and 0xffff into a value between 0 and 1.

In step 1132, ASTC_DP pipeline 444 generates output comprising the RGBA values of the target texel.

At least one technical advantage of the disclosed techniques relative to the prior art is that the disclosed techniques can extract a single texel from a texture block without decompressing the entire texture block. Since computations only need to be performed for a target texel, and other texels in the texture block are not decompressed, the PBRU can extract a single texel more efficiently compared to prior approaches that require an execution unit to decompress an entire texture block.

Although the above steps were described with respect to compressed texture blocks in ASTC format, any compressed or uncompressed texture block format may be used. The specific steps to extracting a single texel may vary depending on the specific texture block format. For example, if the texture block is an uncompressed texture block, a specific texel can be read directly from a memory location corresponding to the specific texel without reading the surrounding texels in the texture block from memory.

Importance Sampling Using a Rendering Engine

When rendering a two-dimensional image of a 3D scene, a plurality of rays are generated that originate from a particular light source and extend towards different directions in the 3D scene. For each ray, an intersection point between the ray and a surface of an object in the 3D scene is identified. Importance sampling is performed at the intersection point to generate a direction corresponding a secondary ray that is produced by the intersection of the ray and the object surface. The secondary ray originates from the intersection point and extends towards the direction generated by importance sampling. Secondary rays may represent, for example, shadows, reflections, refractions, and so forth that are produced when the object surface is hit by light from the light source, e.g., a beam of light represented by the ray, or hit by other secondary rays.

As discussed above, an object surface is modeled using different layers of material properties, such as polish, reflectivity, diffuse behavior, translucency, transparency, and the like, that indicate how light interacts with the surface of the object. Each material property is defined using one or more calculations and/or functions that are evaluated based on one or more variables and/or one or more values that are produced by one or more other material properties.

A material graph can be used to represent the different material properties associated with the object surface and relationships between the different material properties. When performing importance sampling, a particular material property is randomly selected from the different material properties, and the calculations and/or functions of the particular material property are evaluated to generate a direction for a secondary ray. As described in greater detail below in FIGS. 14-16, to perform importance sampling based on the material graph using PBRU 335, the material graph is compiled into a set of importance sampling instructions that can be executed by PBRU 335.

Figure 12:
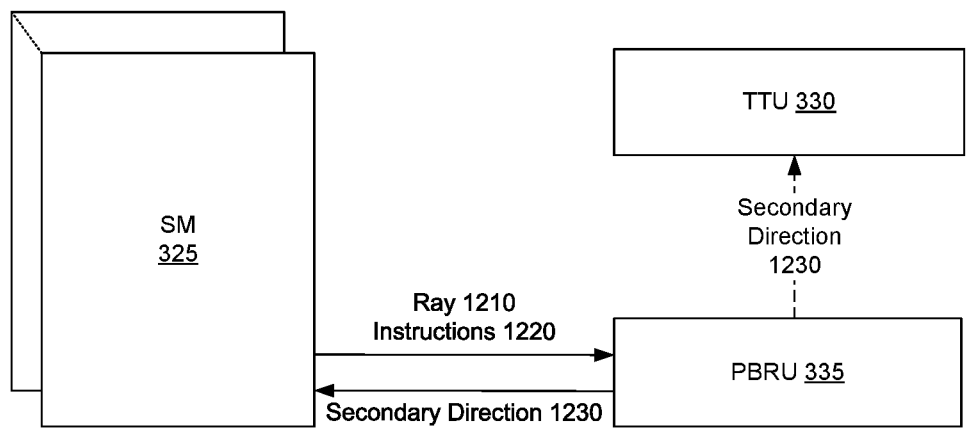
FIG. 12 is a block diagram illustrating data flows for performing importance sampling for a ray using the rendering engine of FIG. 4, according to one embodiment.

FIG. 12 is a block diagram illustrating data flows for performing importance sampling for a ray using the PBRU 335, according to one embodiment.

As shown in FIG. 12, SM 325 sends a ray 1210 to PBRU 335 for performing importance sampling for the ray 1210. In some embodiments, ray 1210 includes a ray identifier for identifying the ray 1210. In some embodiments, SM 325 computes or receives values for one or more variables associated with ray 1210. SM 325 includes the one or more variable values when sending the ray 1210 to PBRU 335.

In some embodiments, SM 325 determines, based on an intersection point between the ray 1210 and a surface of an object in a 3D scene, a set of importance sampling instructions 1220 that correspond to the surface of the object at the intersection point. In some embodiments, SM 325 sends the set of importance sampling instructions 1220, or a portion thereof, to PBRU 335 with the ray 1210. In some embodiments, SM 325 sends an address corresponding to the set of importance sampling instructions 1220. Additionally, SM 325 may send an index value indicating a location of the next instruction to execute within the set of importance sampling instructions 1220. For example, SM 325 may send an index value of 0 indicating that PBRU 335 should begin execution at the first instruction in the set of importance sampling instructions 1220.

In some embodiments, sending the ray 1210 includes sending a ray data structure corresponding to the ray 1210. The ray data structure stores the ray identifier, the address of the set of importance sampling instructions 1220, the index of the starting instruction within the set of importance sampling instructions 1220, and a stack that includes the one or more variables associated with the ray 1210.

PBRU 335 receives ray 1210 and the set of importance sampling instructions 1220, and executes the set of importance sampling instructions 1220 to generate a secondary direction 1230 associated with the ray. As shown in FIG. 12, PBRU 335 can send the secondary direction 1230 to either SM 325 or TTU 330 for further processing.

In some embodiments, SM 325 and/or TTU 330 generate, based on the secondary direction 1230, a secondary ray that originates from the intersection point and extends towards the secondary direction 1230. SM 325 and/or TTU 330 can determine a second intersection point between the secondary ray and a surface of an object in the 3D scene, and send the secondary ray back to PBRU 335 for material shading and/or importance sampling.

It will be appreciated that the operations and data flows described herein are illustrative and that variations and modifications are possible. For example, either the SMs 325 or the TTU 330 may determine an intersection point between a ray and an object in a 3D scene, calculate variable values associated with the ray, determine a set of importance sampling instructions corresponding to the intersection point, transmit the ray to the PBRU 335, and/or transmit the set of importance sampling instructions to the PBRU 335. Similarly, the PBRU 335 may transmit the secondary direction to either the SMs 325 or the TTU 330, irrespective of which one sent the ray to PBRU 335.

Figure 13A:
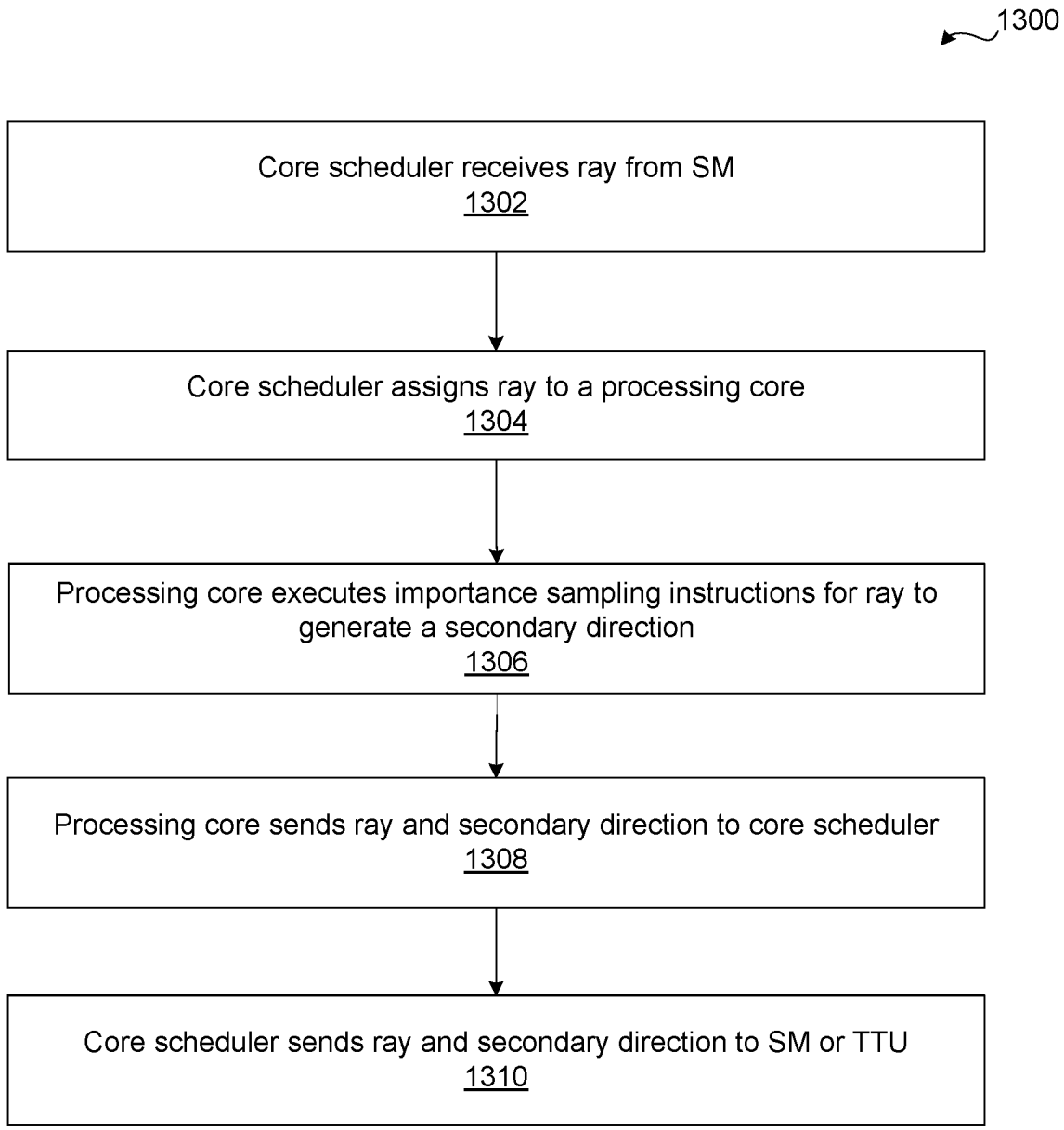
FIG. 13A is a flowchart of method steps for performing importance sampling for a ray using the rendering engine of FIG. 4, according to one embodiment.

FIG. 13A is a flowchart of method steps for performing importance sampling for a ray using a PBRU, according to one embodiment. Although the method steps are described in conjunction with the systems of FIGS. 1-4, persons skilled in the art will understand that any system configured to perform the method steps in any order falls within the scope of the present disclosure.

In step 1302, a core scheduler of a PBRU receives a ray from an SM. For example, core scheduler 420 receives a ray 1210 from SM 325. In some embodiments, core scheduler 420 also receives a set of importance sampling instructions from SM 325. Core scheduler 420 stores the set of importance sampling instructions to the instruction cache 412. In some embodiments, core scheduler 420 receives an address corresponding to a set of importance sampling instructions from SM 325.

In some embodiments, core scheduler 420 receives a ray data structure representing the ray 1210. The ray data structure includes, for example, a ray identifier corresponding to ray 1210, an address of a set of importance sampling instructions 1220, an index of the starting instruction within the set of importance sampling instructions 1220, and a stack that includes one or more variables associated with the ray 1210.

In step 1304, the core scheduler assigns the ray to a processing core. For example, core scheduler 420 assigns ray 1210 to a particular processing core 430 of the plurality of processing cores 430. Core scheduler 420 may determine which processing cores 430 do not have a ray assigned and select a processing core 430 that does not currently have any rays assigned.

In step 1306, the processing core executes the set of importance sampling instructions based on the ray to generate a direction for a secondary ray. For example, processing core 430 executes the set of importance sampling instructions 1220 based on the ray 1210 to generate a direction 1230.

Figure 13B:
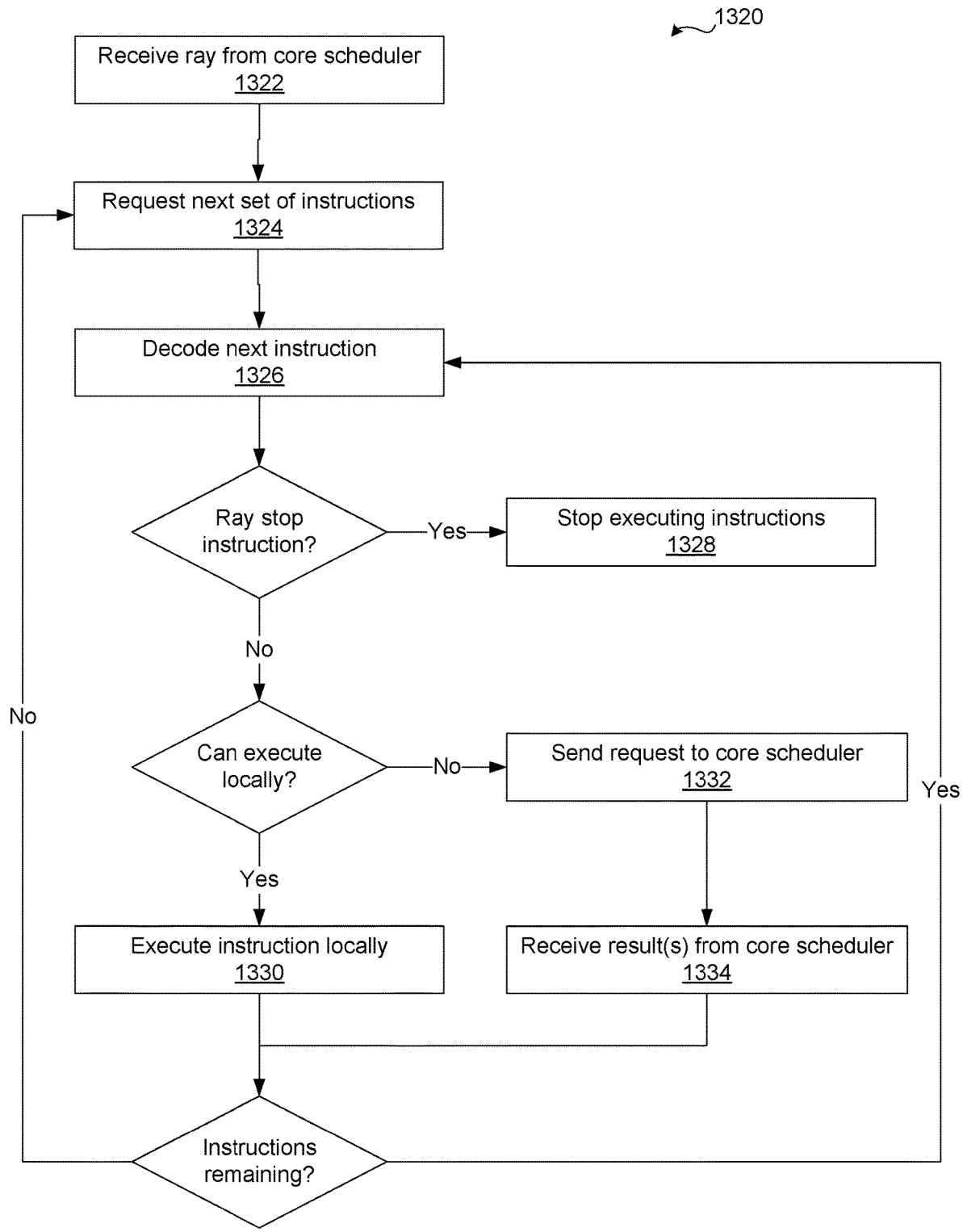
FIG. 13B is a flowchart of method steps for executing a set of importance sampling instructions using the rendering engine of FIG. 4, according to one embodiment.

FIG. 13B is a flowchart of method steps for executing a set of importance sampling instructions, according to one embodiment. Although the method steps are described in conjunction with the systems of FIGS. 1-4, persons skilled in the art will understand that any system configured to perform the method steps in any order falls within the scope of the present disclosure.

In step 1322, a processing core of a PBRU receives a ray from a core scheduler. For example, processing core 430 receives ray 1210 from core scheduler 420. In some embodiments, receiving ray 1210 includes receiving a ray identifier corresponding to ray 1210, an address corresponding to a set of importance sampling instructions 1220, an index of a starting instruction within the set of importance sampling instructions 1220, and a stack that includes the one or more variables associated with the ray 1210.

In step 1324, the processing core 430 requests a next set of importance sampling instructions. In some embodiments, the processing core 430 sends a request to the core scheduler 420 for a set of importance sampling instructions at the instruction address received with the ray 1210. Processing core 430 waits to receive the set of importance sampling instructions from the core scheduler 420 or to receive an indication from core scheduler 420 that the set of importance sampling instructions are available in instruction cache 412. After receiving the next set of importance sampling instructions to execute or an receiving an indication that the next set of importance sampling instructions are in instruction cache 412, the method proceeds to step 706.

In some embodiments, if core scheduler 420 received a set of importance sampling instructions with ray 1210, then core scheduler 420 stores the set of importance sampling instructions in instruction cache 412 or sends the set of importance sampling instructions to the processing core 430 with ray 1210. Processing core 430 may determine that a next set of importance sampling instructions is available and proceed to step 706 without requesting additional instructions.

In step 1326, the processing core 430 decodes the next instruction in the set of importance sampling instructions. Additionally, processing core 430 decodes any immediates that follow the next instruction. Processing core 430 performs one or more different actions depending on the next instruction.

If the next instruction is a ray stop instruction, then in step 1328, the processing core stops executing importance sampling instructions for the ray and sends the ray to the core scheduler. For example, processing core 430 sends ray 1210 to core scheduler 420. If processing core 430 generated a secondary direction 1230, then processing core 430 also sends the secondary direction 1230 to core scheduler 420.

In some embodiments, sending ray 1210 to core scheduler 420 includes sending the stack for ray 1210. If processing core 430 generated a secondary direction 1330, then the secondary direction 1230 is stored at the top of the stack for ray 1210. If processing core 430 has not generated a secondary direction 1230, then the stack reflects the computations that have been completed for ray 1210.

In some embodiments, sending the ray 1210 includes sending an updated ray data structure representing the ray 1210. The updated ray data structure includes, for example, the ray identifier corresponding to ray 1210; the address of the latest set of importance sampling instructions executed by processing core 430; the index of the last instruction, within the latest set of importance sampling instructions, that was executed by processing core 430; and the stack associated with ray 1210.

If the next instruction is an instruction that can be executed locally by the processing core, then in step 1330, the processing core executes the instruction locally. Instructions that can be executed locally include, for example, stack operations such as push, load, and store, and fixed-point arithmetic such as add, multiply, and lerp. After executing the instruction locally, the processing core proceeds to the next instruction, if available.

In some embodiments, the set of importance sampling instructions include a plurality of cases and a random selection instruction that selects a particular case from the plurality of cases to execute. If the next instruction is the random selection instruction, then the processing core executes the random selection instruction to select the particular case to execute. In some embodiments, executing the random selection instruction includes popping a plurality of weights off the stack, where each weight corresponds to a different case in the plurality of cases, and randomly selecting a case number based on the plurality of weights. For example, assume a first case corresponds to a weight w0, a second case corresponds to a weight w1, and a third case corresponds to a weight w2. Executing the random selection instruction includes adding the weights w0, w1, and w2 and generating a random number between 0 and the sum of the weights. If the random number is between 0 and w0 then the first case is selected. If the random number is between w0 and the sum of w0 and w1, then the second case is selected. Finally, if the random number is between the sum of w0 and w1 and the sum of all the weights, then the third case is selected.

The processing core skips to the particular case in the plurality of cases that corresponds to the selected case number, and proceeds to execute the next instruction that is inside the particular case. In some embodiments, each case is denoted by a case instruction and an end case instruction. Processing core may repeatedly proceed to the next instruction and skip execution of the next instruction until the correct number of case and end case instruction pairs have been skipped (i.e., the selected case number minus 1).

If the next instruction is not an instruction that can be executed locally by the processing core, then in step 1332, the processing core sends a request to the core scheduler. For example, if the instruction is for a fixed-function, such as texture address (TTEX_A), texture data path (TTEX_DP), GGX, Oren-Nayar, Schlick-Fresnel, sheen, and so forth, then processing core 430 sends a request for the corresponding pipeline 440 to core scheduler 420. For importance sampling, the instruction may be for a direction version of a fixed-function, which includes the same calculations as the regular fixed-function but generates a direction rather than a color. Sending the request to core scheduler 420 may include popping one or more arguments for the fixed-function off the stack and including the one or more arguments with the request. Core scheduler 420 sends the request and the one or more arguments to the corresponding pipeline 440. The pipeline 440 receives the one or more arguments as one or more inputs, and executes the corresponding fixed-function on the one or more inputs to generate one or more outputs of the fixed-function. The pipeline 440 transmits the one or more outputs back to core scheduler 420, and core scheduler 420 sends the one or more outputs to processing core 430.

In some embodiments, sending the request includes sending an identifier corresponding to ray 1210 with the request. In some embodiments, the identifier corresponding to ray 1210 comprises the ray identifier corresponding to ray 1210. In some embodiments, the identifier corresponding to ray 1210 comprises an identifier corresponding to the processing core 430. If a plurality of rays is assigned to processing core 430, the identifier also comprises an index value that corresponds to an index of the ray 1210 within the plurality of rays assigned to processing core 430. When the one or more outputs are transmitted to core scheduler 420, the identifier is included with the one or more outputs. Core scheduler 420 uses the identifier to determine that the one or more outputs should be sent to processing core 430.

After sending the request to core scheduler 420, processing core 430 waits until, at step 1334, processing core 430 receives one or more results from core scheduler 420. If the one or more results include one or more values, such as one or more values generated by a pipeline 440, then processing core 430 pushes the one or more values onto the stack. After receiving the one or more results from core scheduler 420, processing core 430 proceeds to the next instruction, if available.

If there are no instructions remaining in the set of instructions but the processing core 430 has not reached a ray stop instruction and stopped executing instructions for the ray, then the method returns to step 1324 where processing core 430 requests a next set of instructions to execute. Processing core 430 requests the next set of importance sampling instructions at the instruction address received with the ray 510, incremented by the index of the last instruction that was executed.

If there are instructions remaining in the set of instructions, then the method returns to step 706, where processing core 430 decodes the next instruction in the set of instructions.

Returning to FIG. 13A, after the processing core finishes executing the set of importance sampling instructions, in step 1308, core scheduler receives a ray and a secondary direction from the processing core. For example, core scheduler 420 receives ray 1210 and secondary direction 1230 from processing core 430. In some embodiments, core scheduler 420 receives a stack for ray 1210 from processing core 430, where the secondary direction 1230 is stored at the top of the stack. In some embodiments, core scheduler 420 receives an updated ray data structure, representing the ray 1210, from processing core 430. The updated ray data structure includes, for example, the ray identifier corresponding to ray 1210; the address of the latest set of importance sampling instructions executed by processing core 430; the index of the last instruction, within the latest set of importance sampling instructions, that was executed by processing core 430; and the stack associated with ray 1210.

In step 1310, the core scheduler sends the ray and the secondary direction to an SM and/or a TTU for further processing. For example, core scheduler 420 sends ray 1210 and secondary direction 1230 to SM 325 and/or TTU 330.

Compiling Material Graphs

Figure 14:
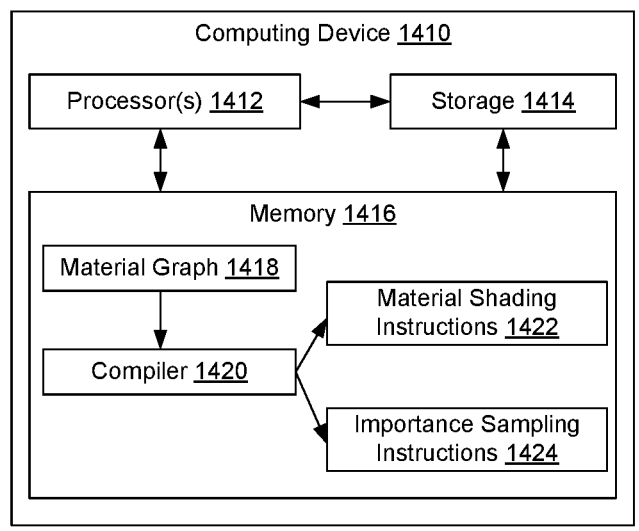
FIG. 14 is a block diagram illustrating a computing device configured to implement one or more aspects of various embodiments.

FIG. 14 is a block diagram illustrating a computing device 1410 configured to implement one or more aspects of various embodiments. As shown, computing device 1410 includes one or more processors 1412, a storage 1414, and memory 1416. In some embodiments, computing device 1410 is a separate computing device from a computing device on which a PPU 202, including PBRU 335, resides. In other embodiments, computing device 1410 may be the same computing device on which a PPU 202 and a PBRU 335 reside, such as the computing device 100 illustrated in FIG. 1.

Computing device 1410 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 1410 described herein is illustrative and that any other technically feasible configurations fall within the scope of the present disclosure.

The one or more processors 1412 include any suitable processors implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, the one or more processors 1412 may be any technically feasible hardware unit capable of processing data and/or executing software applications. Further, in the context of this disclosure, the computing elements shown in computing device 1410 may correspond to a physical computing system (e.g., a system in a data center) or may be a virtual computing embodiment executing within a computing cloud.

Storage 1414 includes non-volatile storage for applications and data, and may include fixed or removable disk drives, flash memory devices, and CD-ROM, DVD-ROM, Blu-Ray, HD-DVD, or other magnetic, optical, or solid-state storage devices. Material graph 1418 and compiler 1420 may be stored in storage 114 and loaded into memory 1416 during execution.

Memory 1416 includes a random-access memory (RAM) module, a flash memory unit, or any other type of memory unit or combination thereof. The one or more processors 1412 are configured to read data from and write data to memory 1416. Memory 1416 includes various software programs that can be executed by the one or more processors 1412 and application data associated with said software programs, including compiler 1420.

As discussed above, a material graph is a graph structure that is used to represent the different material properties of an object surface and the relationships between the different material properties.

Figure 15:
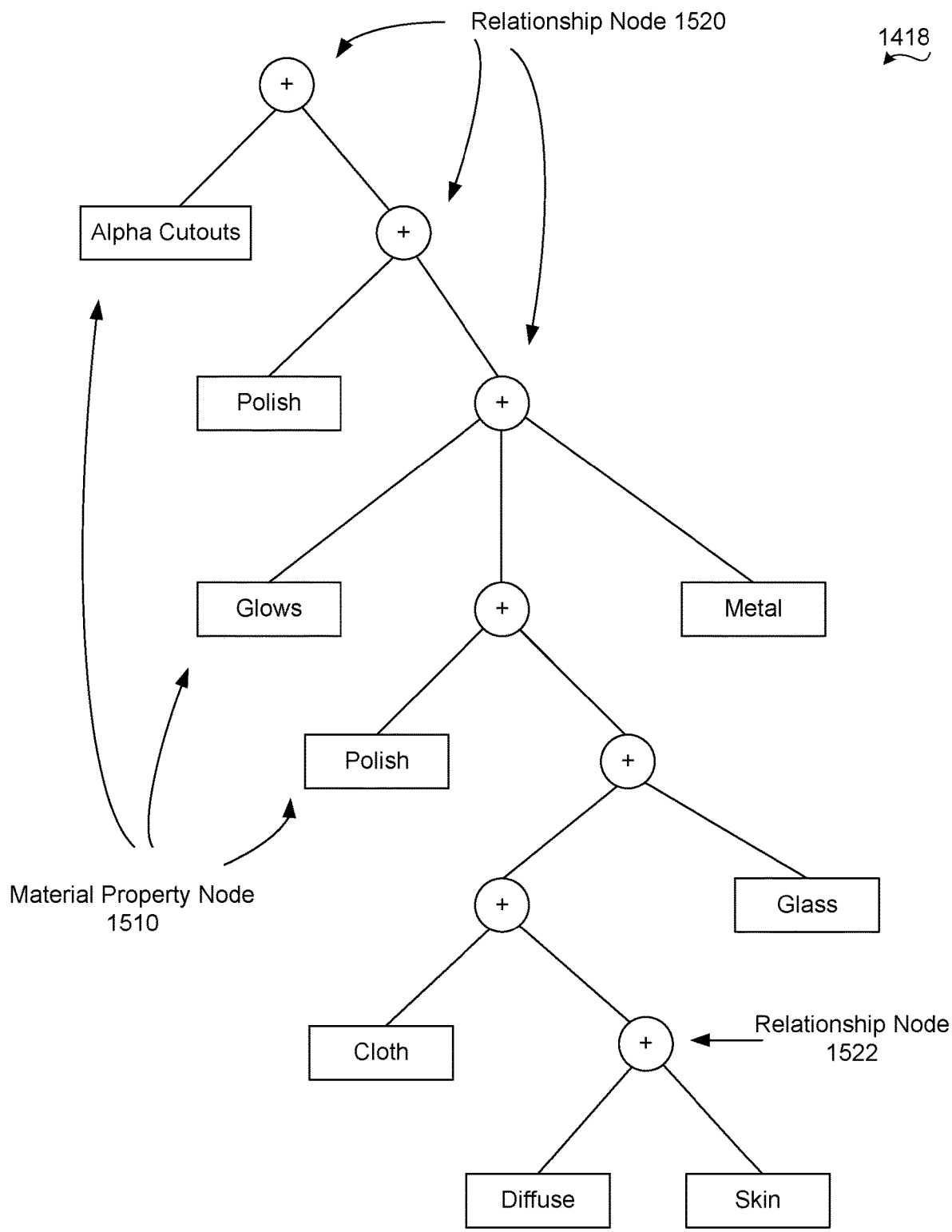
FIG. 15 is a conceptual diagram illustrating an example material graph, according to one embodiment.

FIG. 15 illustrates an example material graph 1418. As shown, material graph 1418 comprises a plurality of nodes. The plurality of nodes includes a plurality of material property nodes 1510 that define material properties, such as alpha cutouts, polish, glows, metal, glass, and the like. Although not shown in FIG. 15, each material property node 1510 can comprise a plurality of additional nodes that further define one or more variables associated with the material property node 1510 and one or more calculations performed on the variables to compute one or more values corresponding to the material property node 1510.

Additionally, the plurality of nodes includes a plurality of relationship nodes 1520 that define relationships between the material properties. For example, a relationship node 1522 indicates that the material property diffuse should be combined with the material property skin. Although not shown in FIG. 15, each relationship node 1522 defines one or more calculations performed based on values corresponding to the child nodes of the relationship node 1522 to generate one or more values corresponding to the relationship node 1522.

When performing material shading and/or importance sampling for a ray that intersects the surface of the object, the different material properties and the relationships between the different material properties are evaluated based on the ray. For example, each material property node 1510 are evaluated based on the ray to generate one or more values corresponding to the material property node 1510, and each relationship node 1522 is evaluated based on the one or more values generated for the material property nodes 1510 to generate one or more values corresponding to the relationship node 1522.

Typically, a material graph may be compiled into a plurality of different shader programs, where each shader program corresponds to different portions of the material graph and/or different sets of parameters for the different material properties. The shader programs can be executed by a processor such as CPU 102 or an SM 325. However, since the shader programs are compiled into a general-purpose machine language for execution on a variety of processors, the shader programs include significant overhead. Additionally, since different portions of a material graph and/or material graphs with different material property parameters are compiled into different shader programs, the number of shader programs that need to be compiled for rendering a 3D scene can grow exponentially compared to the number of different types of object surfaces in the 3D scene. For example, referring to FIG. 15, each material property node 1510 may correspond to a different shader program.

Rather than compiling a material graph into a plurality of shader programs, compiler 1420 generates one or more sets of byte code instructions based on the material graph. Each set of byte code instructions comprise byte code that can be executed by a hardware-based rendering engine, such as PBRU 335. When executed by a PBRU, each set of byte code instructions causes the PBRU to evaluate the different material properties, and the relationships between the different material properties, that are defined by the material graph.

As shown, compiler 1420 receives material graph 1418 and generates a set of material shading instructions 1422 and a set of importance sampling instructions 1424 based on material graph 1418. The set of material shading instructions 1422, when executed by a PBRU, cause the PBRU to generate a color associated with the intersection of a ray with an object surface that has the material properties defined by material graph 1418. The set of importance sampling instructions 1424, when executed by a PBRU, cause the PBRU to generate a direction of a secondary ray that is generated when a primary ray intersects with an object surface that has the material properties defined by material graph 1418.

In some embodiments, compiler 1420 receives a textual representation of material graph 1418. Compiler 1420 parses the textual representation of material graph 1418 to generate an expression tree, such as a postfix expression tree. The expression tree includes, for each node of the material graph 1418, one or more expressions corresponding to the node. In some embodiments, the one or more expressions correspond to the one or more calculations defined by the node. Each expression included in the expression tree is represented as a set of one or more nodes in the expression tree.

In some embodiments, compiler 1420 checks the semantic integrity of the expression tree to determine whether any errors are included in the expression tree. Checking the semantic integrity of the expression tree includes, for example, determining whether variables are defined in the expression tree before the variables are used and/or determining whether functions include the correct number of arguments. If compiler 1420 determines that the expression tree includes errors, then compiler 1420 does not proceed with generating a set of byte code instructions.

In some embodiments, compiler 1420 simplifies one or more expressions or sub-expressions in the expression tree. Simplifying one or more expressions or sub-expressions may include, for example: deleting unused variables, folding constants (e.g., replacing a set of nodes corresponding to 5*12 with a single node corresponding to 60), simplifying expressions (e.g., x+0, x*0, x+1, x/1, 0/x), determining whether a texture function can be replaced with a constant color, replacing function calls that evaluate to constants with the constants (e.g., replacing an Oren-Nayar function when roughness equals 0 with the value 1/pi), or deleting storage for variables that are only used once. Any technically feasible simplifications and/or optimizations can be performed on the expression tree based on the different functions and variables included in the material graph 1418.

In some embodiments, if compiler 1420 is generating importance sampling instructions, then compiler 1420 removes one or more portions of the expression tree that do not affect direction and/or weights, such as some nodes that correspond to texture functions.

In some embodiments, if compiler 1420 is generating importance sampling instructions, then compiler 1420 creates a list comprising the plurality of leaf nodes included in the expression tree. Compiler 1420 generates a random selection node above the plurality of leaf nodes, and replaces the root of the expression tree with the random selection node. The expression tree, modified for importance sampling, includes the random selection node as a root node and the plurality of leaf nodes under the random selection node.

For each leaf node of the plurality of leaf nodes, compiler 1420 determines a weight associated with the leaf node. Compiler 1420 assigns the weight associated with the leaf node to the leaf node. In some embodiments, assigning weights to leaf nodes comprises adding one or more nodes to the expression tree that define the weight values and/or that correspond to instructions associated with computing the weight values. As discussed below, the weight assigned to a leaf node can be a specific weight or the weight can be dynamically generated by executing one or more instructions corresponding to the portion of the material graph associated with the leaf node. The one or more nodes are added to the expression tree above the random selection node, so that the corresponding instructions are executed prior to executing a random selection instruction.

In some embodiments, each leaf node in the plurality of leaf nodes is assigned an equal weight. For example, compiler 1420 may compute a value of 1 divided by the number of leave nodes, and assign the value to each leaf node of the plurality of leaf nodes.

In some embodiments, the material graph 1418 specifies weights that correspond to each leaf node. Compiler 1420 determines the weight specified for each leaf node and assigns the weight to the leaf node.

In some embodiments, the weight of each leaf node is based on the contribution of the leaf node to the material graph 1418. That is, the weight of each leaf node is based on how the leaf node is weighted in the material graph 1418. For example, a first leaf node that contributes a small value may be assigned a smaller weight compared to a second leaf node that contributes a large value. In some embodiments, compiler 1420 evaluates the material graph 1418 to determine the amount each leaf node contributes to the overall result generated by the material graph 1418. Compiler 1420 determines the weight for each leaf node based on the amounts.

Compiler 1420 converts function calls referenced by the leaf nodes to direction function calls. For example, if a leaf node calls an Oren-Nayar function, compiler 1420 modifies the leaf node to call an Oren-Nayar direction function. Additionally, compiler 1420 modifies the arguments for leaf node based on the direction function call. Referring to the above example, the regular Oren-Nayar function may include arguments corresponding to the direction of an intersecting ray and roughness. The Oren-Nayar direction function does not need those arguments to calculate a direction, so compiler 1420 removes those arguments from the expression tree.

Compiler 1420 generates a set of byte code instructions based on the expression tree or the processed expression tree. In some embodiments, compiler 1420 traverses the expression tree and, for each node of the expression tree, generates one or more byte code instructions corresponding to the node. For example, if a node of the expression tree defines a value for a variable, then compiler 1420 generates a byte code instruction that pushes the value of the variable onto a stack. As another example, the PBRU is configured to execute a plurality of built-in functions, such as the fixed-functions implemented by the pipelines 440 of PBRU 335. If a node of the expression tree includes a call to a built-in function, then compiler 1420 generates a byte code instruction that calls the function.

In some cases, material graph 1418 and the corresponding expression tree may include a function or operation that cannot be converted into byte code instructions. For example, a node of the expression tree may include a call to a function that is not a built-in function or that cannot be expressed using available byte code instructions. In some embodiments, if compiler 1420 determines that a function cannot be converted into byte code instructions, compiler 1420 may generate a ray stop instruction to replace the function. Additionally, in some embodiments, compiler 1420 may generate an additional set of instructions corresponding to the function that can be executed by a processor, such as an SM 325, rather than by a PBRU.

In some embodiments, compiler 1420 traverses the expression tree using bottom-up traversal. However, for the random selection node, compiler 1420 performs top-down traversal. For a random selection node, compiler 1420 generates a byte code instruction corresponding to a random selection function. For each leaf node under the random select node, compiler 1420 generates a case instruction, one or more bytecode instructions corresponding to the leaf node, and an end case byte code instruction. The importance sampling instructions 1424 generated by compiler 1420 include a plurality of cases, each denoted by the case and end case byte code instructions, and the random selection function selects a particular case from the plurality of cases to execute.

In some embodiments, after generating the set of byte code instructions based on the expression tree, compiler 1420 adds a ray stop instruction at the end of the set of byte code instructions. In some embodiments, the expression tree includes one or more nodes that correspond to a ray stop instruction and the compiler 1420 generates the ray stop instruction(s) while generating byte code instructions based on the expression tree. If the set of byte code instructions end with a ray stop instruction, then compiler 1420 does not add another ray stop instruction at the end of the set of byte code instructions.

Since the byte code instructions generated by compiler 1420 are targeted towards the PBRU, the overhead required by the set of byte code instructions is much lower compared to the overhead required by the shader program(s). Additionally, since each byte code instruction only takes up one byte, the amount of storage and memory needed to store and execute a set of byte code instructions corresponding to a material graph is much less than the amount of storage and memory needed to store and execute the plurality of shader programs.

As an example, a shader program includes if-statements, but the SMs are not good at branching. Thus, rather than including branches in a single shader program, different versions of the shader program may be compiled that each take different branches within the shader program, and additional code is included to determine which version of the shader program needs to be executed. As such, using conventional techniques, a single material graph can correspond to a large number of shader programs. In contrast, with the disclosed techniques, only one set of byte code instructions needs to be generated and executed.

Figure 16:
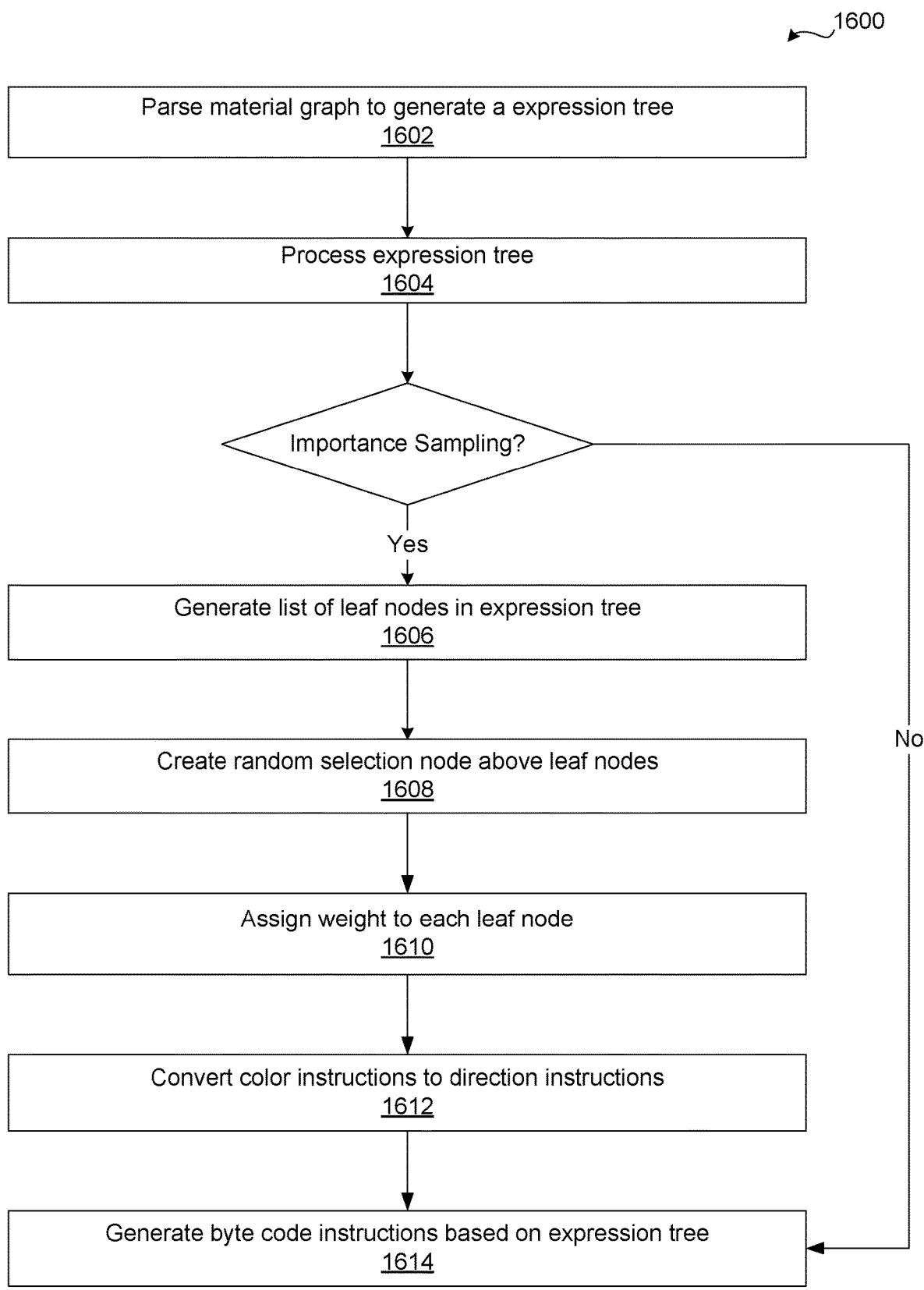
FIG. 16 is a flowchart of method steps for compiling a material graph into byte code instructions, according to one embodiment.

FIG. 16 is a flowchart of method steps for compiling a material graph, according to one embodiment. Although the method steps are described in conjunction with the computing device of FIG. 14, persons skilled in the art will understand that any computing device or system configured to perform the method steps in any order falls within the scope of the present disclosure.

In step 1602, the compiler parses a material graph to generate an expression tree. For example, compiler 1420 parses material graph 1418 to generate an expression tree corresponding to material graph 1418. The expression tree includes, for each node of the material graph 1418, one or more expressions corresponding to the node. In some embodiments, the one or more expressions correspond to the one or more calculations defined by the node. Each expression included in the expression tree is represented as a set of one or more nodes in the expression tree.

In step 1604, compiler 1420 processes the expression tree to generate a processed expression tree. Processing the expression tree is performed in a manner similar to that disclosed above with respect to compiler 1420.

In some embodiments, compiler 1420 checks the semantic integrity of the expression tree to determine whether any errors are included in the expression tree. Checking the semantic integrity of the expression tree includes, for example, determining whether variables are defined in the expression tree before the variables are used and/or determining whether functions include the correct number of arguments. If compiler 1420 determines that the expression tree includes errors, then compiler 1420 does not proceed with generating a set of byte code instructions.

In some embodiments, compiler 1420 simplifies one or more expressions or sub-expressions in the expression tree. Simplifying one or more expressions or sub-expressions may include, for example: deleting unused variables, folding constants (e.g., replacing a set of nodes corresponding to 5*12 with a single node corresponding to 60), simplifying expressions (e.g., x+0, x*0, x+1, x/1, 0/x), determining whether a texture function can be replaced with a constant color, replacing function calls that evaluate to constants with the constants (e.g., replacing an Oren-Nayar function when roughness equals 0 with the value 1/pi), or deleting storage for variables that are only used once.

In some embodiments, if compiler 1420 is generating importance sampling instructions, then compiler 1420 removes one or more portions of the expression tree that do not affect direction and/or weights, such as some nodes that correspond to texture functions. Compiler 1420 determines, for each node, whether the node is required for computing a weight for a leaf node. If the node is not required for computing a weight for a leaf node, then compiler 1420 removes the node.

In some embodiments, if compiler 1420 is generating importance sampling instructions, then compiler 1420 removes one or more portions of the expression tree that define variables or arguments that are not used to for direction functions. For example, a regular (material shading) Oren-Nayar function may include arguments corresponding to the direction of an intersecting ray and roughness, but the Oren-Nayar direction function does not include those arguments, as the arguments are not needed to calculate a direction. Compiler 1420 removes the nodes corresponding to the direction of an intersecting ray and roughness from the expression tree.

If the compiler 1420 is generating material shading instructions, then the method proceeds to step 1614 below, where the compiler 1420 generates byte code instructions based on the processed expression tree.

If the compiler 1420 is generating importance sampling instructions, then the method proceeds to step 1606. In step 1606, the compiler 1420 generates a list of leaf nodes in the processed expression tree. In some embodiments, each leaf node corresponds to a function call, such as GGX, Oren-Nayar, sheen, and so forth.

At step 1608, compiler 1420 generates a random selection node above the plurality of leaf nodes. The random selection node corresponds to a random selection function that randomly selects a case, from a plurality of cases, to execute. In some embodiments, each case included in the plurality of cases corresponds to a leaf node in the list of leaf nodes. Compiler 1420 replaces the parent node(s) of each leaf node with the random selection node. Additionally, compiler 1420 replaces the root of the expression tree with the random selection node. The expression tree, modified for importance sampling, includes the random selection node as a root node and the plurality of leaf nodes as child nodes of the random selection node.

At step 1610, the compiler computes a weight for each leaf node and assigns the weight to the leaf node. Computing a weight for each leaf node is performed in a manner similar to that disclosed above with respect to compiler 1420.

In some embodiments, each leaf node included in the plurality of leaf nodes is assigned an equal weight. For example, compiler 1420 may compute a value of 1 divided by the number of leaf nodes, and assign the value to each leaf node of the plurality of leaf nodes.

In some embodiments, the material graph 1418 specifies weights that correspond to each leaf node. Compiler 1420 determines the weight specified for each leaf node and assigns the weight to the leaf node.

In some embodiments, the weight of each leaf node is based on the contribution of the leaf node to the material graph 1418. That is, the weight of each leaf node is based on how the leaf node is weighted in the material graph 1418. For example, a first leaf node that contributes a small value may be assigned a smaller weight compared to a second leaf node that contributes a large value. In some embodiments, compiler 1420 evaluates the material graph 1418 to determine the amount each leaf node contributes to the overall result generated by the material graph 1418. Compiler 1420 determines the weight for each leaf node based on the amounts.

At step 1612, the compiler converts references to color instructions with references to direction instructions. In some embodiments, each leaf node corresponds to a function call, such as GGX, Oren-Nayar, sheen, and so forth. Compiler 1420 replaces the function call in each leaf node with a call to a direction version of the function. For example, a function call for GGX is replaced with a function call for GGX_Direction.

At step 1612, the compiler generates byte code instructions based on the processed expression tree. Generating the byte code instructions is performed in a manner similar to that disclosed above with respect to compiler 1420.

In some embodiments, compiler 1420 traverses the expression tree and, for each node of the expression tree, generates one or more byte code instructions corresponding to the node. For example, if a node of the expression tree defines a value for a variable, then compiler 1420 generates a byte code instruction that pushes the value of the variable onto a stack. As another example, the PBRU is configured to execute a plurality of built-in functions, such as the fixed-functions implemented by the pipelines 440 of PBRU 335. If a node of the expression tree includes a call to a built-in function, then compiler 1420 generates a byte code instruction that calls the function.

In some cases, material graph 1418 and the corresponding expression tree may include a function or operation that cannot be converted into byte code instructions. For example, a node of the expression tree may include a call to a function that is not a built-in function or that cannot be expressed using available byte code instructions. In some embodiments, if compiler 1420 determines that a function cannot be converted into byte code instructions, compiler 1420 may generate a ray stop instruction to replace the function. Additionally, in some embodiments, compiler 1420 may generate an additional set of instructions corresponding to the function that can be executed by a processor, such as an SM 325, rather than by a PBRU. For example, if the function corresponds to a user-defined function, compiler 1420 may be configured to generate instructions that, when executed by a processor such as the SM 325, calls the user-defined function.

In some embodiments, compiler 1420 traverses the expression tree using bottom-up traversal. However, for the random selection node, compiler 1420 performs top-down traversal. For a random selection node, compiler 1420 generates a byte code instruction corresponding to a random selection function. For each leaf node under the random select node, compiler 1420 generates a case instruction, one or more bytecode instructions corresponding to the leaf node, and an end case byte code instruction. The importance sampling instructions 1424 generated by compiler 1420 include a plurality of cases, each denoted by the case and end case byte code instructions, and the random selection function selects a particular case from the plurality of cases to execute.

In some embodiments, after generating the set of byte code instructions based on the expression tree, compiler 1420 adds a ray stop instruction at the end of the set of byte code instructions if the ray stop instruction was not present at the end of the set of byte code instructions.

In sum, the disclosed techniques enable efficient evaluation of material graphs for material shading. A programmable rendering engine is coupled to one or more tree traversal units and one or more streaming multiprocessors. The rendering engine comprises a plurality of MIMD processing cores and a plurality of pipelines that are shared between the plurality of processing cores. Each pipeline is a fixed-function unit that is configured to perform a particular complex function or evaluation associated with the material graph. The material graph is compiled into a set of assembly language instructions for the rendering engine.

When the rendering engine receives a ray, the rendering engine assigns the ray to a processing core of the plurality of processing cores. The processing core executes a compiled material graph based on the ray and the intersecting surface. When the processing core executes an instruction corresponding to a pipeline, the processing core sends the operation parameters to the pipeline and receives corresponding output generated by the pipeline.

In one approach, a streaming multiprocessor provides a ray to a tree traversal unit for evaluation. The tree traversal unit determines a surface that intersects with the ray, and sends the ray and the surface to the rendering engine for material shading. Alternately, a streaming multiprocessor may send a ray and a surface to the rendering engine for material shading. The rendering engine executes the compiled material graph and returns a corresponding color to the tree traversal unit or the streaming multiprocessor.

In one approach, a streaming multiprocessor utilizes the plurality of pipelines of the rendering engine for performing functions or evaluations associated with the pipelines. The streaming multiprocessor sends input to a particular pipeline of the plurality of pipelines, rather than to the rendering engine for assignment to a processing core. The pipeline performs the associated function or evaluation on the input and sends the output to the streaming multiprocessor.

In one approach, a streaming multiprocessor provides a ray to the rendering engine for importance sampling. In addition to generating a set of assembly language instructions for executing the material graph, a compiler also generates a set of assembly language instructions for performing importance sampling based on the material graph. The rendering engine executes the importance sampling instructions based on the ray and returns a direction for a secondary ray to the streaming multiprocessor.

At least one technical advantage of the disclosed techniques is that a rendering engine is provided that is specially designed to perform ray tracing operations and other serial processing tasks with improved efficiency relative to prior art solutions. Accordingly, the rendering engine can be incorporated into a GPU or other parallel processing unit, and processing tasks that cannot be parallelized effectively across the conventional processing elements within the GPU or other parallel processing unit can be offloaded to the rendering engine, which increases overall processing performance and throughput. In this regard, multiple MIMD (multiple input, multiple data) processing cores are implemented within the rendering engine, where each processing core is configured to asynchronously process a different ray or other unit of serial processing work, which enables ray tracing operations and other serial processing tasks to be performed largely in parallel across the different processing cores. In addition, to further improve overall processing throughput, the rendering engine includes multiple pipelines that are designed to perform certain specialized processing tasks. During operation, the processing cores can offload the specialized processing tasks to the different pipelines, and a scheduler that resides within the rendering engine is configured to schedule the offloaded tasks across the different pipelines in an optimized manner. Furthermore, the specialized processing task performed by a pipeline may be optimized to improve the processing throughput for individual processing tasks.

Another technical advantage is that each material graph is compiled into a single set of assembly language instructions for the rendering engine. Unlike prior art approaches, different permutations of materials properties and material property parameters do not need to be compiled separately into multiple material shader programs. Furthermore, during compilation, the compiler can optimize the instructions based on the material graph semantics, the different material property parameters, and the hardware architecture of the rendering engine.

1. In some embodiments, a computer-implemented method for processing ray tracing operations in parallel comprises receiving a plurality of rays and a corresponding set of importance sampling instructions for each ray included in the plurality of rays for processing, wherein each ray represents a path from a light source to at least one point within a three-dimensional (3D) environment, and each corresponding set of importance sampling instruction is based at least in part on one or more material properties associated with at least one surface of at least one object included in the 3D environment; assigning each ray included in the plurality of rays to a different processing core included in a plurality of processing cores; and for each ray included in the plurality of rays, causing the processing core assigned to the ray to execute the corresponding set of importance sampling instructions on the ray to generate a direction for a secondary ray that is produced when the ray intersects a surface of an object within the 3D environment.

2. The method of clause 1, wherein the plurality of rays includes one or more rays received from a tree traversal unit.

3. The method of clause 1 or 2, wherein the plurality of rays includes one or more rays received from a processing unit.

4. The method of any of clauses 1-3 further comprising, for each ray included in the plurality of rays, receiving the direction for the secondary ray from the processing core assigned to the ray.

5. The method of any of clauses 1-4 further comprising, for each ray included in the plurality of rays, transmitting the direction for the secondary ray to one of a tree traversal unit or a processing unit.

6. The method of any of clauses 1-5, further comprising, receiving one or more secondary rays and a corresponding set of instructions for each secondary ray included in the one or more secondary rays, wherein each secondary ray was generated by the tree traversal unit based on a direction transmitted to the tree traversal unit.

7. The method of any of clauses 1-6 further comprising, receiving one or more secondary rays and a corresponding set of instructions for each secondary ray included in the one or more secondary rays, wherein each secondary ray was generated by the processing unit based on a direction transmitted to the processing unit.

8. The method of any of clauses 1-7 wherein receiving the plurality of rays comprises receiving, for each ray included in the plurality of rays, a first data structure corresponding to the ray, wherein the first data structure stores one or more first values associated with the ray.

9. The method of any of clauses 1-8 further comprising, for each ray included in the plurality of rays, receiving a second data structure corresponding to the ray from the processing core assigned to the ray, wherein the second data structure stores one or more second values associated with the ray.

10. The method of any of clauses 1-9 wherein the one or more second values include the direction for the secondary ray.

11. The method of any of clauses 1-10 further comprising, transmitting the second data structure to one of a tree traversal unit or a processing unit.

12. The method of any of clauses 1-11 further comprising receiving a first request from a first processing core included in the plurality of processing cores, wherein the first request is for a first fixed-function pipeline; transmitting the first request to the first fixed-function pipeline; receiving one or more results from the first fixed-function pipeline; and transmitting the one or more results to the first processing core.

13. The method of any of clauses 1-12, wherein the first fixed-function pipeline corresponds to an importance sampling function, and wherein the one or more results include a direction for a secondary ray.

14. The method of any of clauses 1-13, wherein the corresponding set of importance sampling instructions comprises a plurality of instruction cases, wherein each instruction case corresponds to a different subset of the corresponding set of importance sampling instructions.

15. The method of any of clauses 1-14, the corresponding set of importance sampling instructions, when executed by the processing core, causes the processing core to select a first instruction case from the plurality of instruction cases and execute a subset of the corresponding set of importance sampling instructions that correspond to the first instruction case.

16. The method of any of clauses 1-15, wherein the processing core does not execute subsets of the corresponding set of importance sampling instructions that do not correspond to the first instruction case.

17. In some embodiments, an execution unit comprises a plurality of processing cores; and a scheduler that receives a plurality of rays and assigns each ray included in the plurality of rays to a different processing core included the plurality of processing cores, wherein each ray represents a path from a light source to at least one point within a three-dimensional (3D) environment, each processing core generates a direction of a second ray that is based on the ray assigned to the processing core and is produced when the ray assigned to the processing core intersects a surface of an object within the 3D environment.

18. The execution unit of clause 17, further comprising a plurality of processing pipelines that execute specialized functions on data received from the plurality of processing cores.

19. The execution unit of clause 17 or 18, wherein the specialized functions include one or more importance sampling functions.

20. The execution unit of any of clauses 17-19, wherein the scheduler further receives a plurality of directions from the plurality of processing core and transmits the plurality of directions to one or more processing units.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing ray tracing operations within a three-dimensional computer-based environment, the method comprising:
    receiving a first ray and a first set of importance sampling instructions associated with the first ray, wherein the first set of importance sampling instructions is based at least in part on one or more material properties associated with a particular surface within the three-dimensional computer-based environment being intersected by the first ray;
    receiving a second ray and a second set of importance sampling instructions associated with the second ray, wherein the second set of importance sampling instructions is based at least in part on one or more material properties associated with a particular surface within the three-dimensional computer-based environment being intersected by the second ray;
    assigning the first ray to a first processing core included in a plurality of processing cores and the second ray to a second processing core included in the plurality of processing cores;
    causing the first processing core to execute the first set of importance sampling instructions on the first ray to generate a direction for a first secondary ray that results from the particular surface within the three-dimensional computer-based environment being intersected by the first ray; and
    causing the second processing core to execute the second set of importance sampling instructions on the second ray to generate a direction for a second secondary ray that results from the particular surface within the three-dimensional computer-based environment being intersected by the second ray.

2. The method of claim 1, wherein the particular surface being intersected by the first ray and the particular surface being intersected by the second ray comprise a same surface of an object residing within the three-dimensional computer-based environment.

3. The method of claim 2, wherein the particular surface being intersected by the first ray comprises a surface that is different from the particular surface being intersected by the second ray.

4. The method of claim 3, wherein the particular surface being intersected by the first ray and the particular surface being intersected by the second ray comprise different surfaces of an object residing within the three-dimensional computer-based environment.

5. The method of claim 3, wherein the particular surface being intersected by the first ray comprises a surface of a first object residing within the three-dimensional computer-based environment, and the particular surface being intersected by the second ray comprises a surface of a second object residing within the three-dimensional computer-based model.

6. The method of claim 1, wherein the first processing core executes the first set of importance sampling instructions on the first ray at least partially in parallel with the second processing core executing the second set of importance sampling instructions on the second ray.

7. The method of claim 1, wherein at least one of the first ray or the second ray is received from a tree traversal unit.

8. The method of claim 1, wherein at least one of the first ray or the second ray is received from a processing unit.

9. The method of claim 1, further comprising receiving the direction for the first secondary ray from the first processing core, and receiving the direction for the second secondary ray from the second processing core.

10. The method of claim 1, further comprising transmitting each of the direction for the first secondary ray and the direction for the second secondary ray to one of a tree traversal unit or a processing unit.

11. The method of claim 1, further comprising receiving a data structure corresponding to the first ray from the first processing core, wherein the data structure stores one or more values associated with the first ray.

12. The method of claim 11, wherein the one or more values include the direction for the first secondary ray.

13. The method of claim 1, further comprising, transmitting the data structure to one of a tree traversal unit or a processing unit.

14. The method of claim 1 further comprising:
receiving a first request from the first processing core for a first fixed-function pipeline;
transmitting the first request to the first fixed-function pipeline;
receiving one or more results from the first fixed-function pipeline; and
transmitting the one or more results to the first processing core.

15. The method of claim 14, wherein the first fixed-function pipeline corresponds to an importance sampling function, and wherein the one or more results include the direction for first secondary ray.

16. The method of claim 1, wherein the first set of importance sampling instructions comprises a plurality of instruction cases, each instruction case corresponding to a different subset of the first set of importance sampling instructions, and, when the first processing core executes the first set of importance sampling instructions, the first processing core selects a first instruction case from the plurality of instruction cases and executes a subset of the first set of importance sampling instructions that correspond to the first instruction case.

17. An execution unit, comprising:
a plurality of processing cores; and
a scheduler that:
receives a first ray and a first set of importance sampling instructions;
receives a second ray and a second set of importance sampling instructions;
assigns the first ray to a first processing core included in the plurality of processing cores and the second ray to a second processing core included in the plurality of processing cores;
causes the first processing core to execute the first set of importance sampling instructions on the first ra; and
causes the second processing core to execute the second set of importance sampling instructions on the second ray.

18. The execution unit of claim 17, further comprising a plurality of processing pipelines that execute specialized functions on data received from the plurality of processing cores.

19. The execution unit of claim 18, wherein the specialized functions include one or more important sampling functions.

20. The execution unit of claim 17, wherein the scheduler further receives a plurality of directions from the plurality of processing cores and transmits the plurality of directions to one or more processing units.

21. The execution unit of claim 17, wherein the first set of importance sampling instructions is based at least in part on one or more material properties associated with a particular surface within a three-dimensional computer-based environment intersected by the first ray.

22. The execution unit of claim 17, wherein the second set of importance sampling instructions is based at least in part on one or more material properties associated with a particular surface within the three-dimensional computer-based environment intersected by the second ray.

23. The execution unit of claim 17, wherein the first processing core executes the first set of importance sampling instructions on the first ray to generate a direction for a first secondary ray that corresponds to the first ray.

24. The execution unit of claim 23, wherein the first secondary ray results from the first ray intersecting the particular surface within the three-dimensional computer-based environment.

25. The execution unit of claim 23, wherein the second secondary ray results from the second ray intersecting the particular surface within the three-dimensional computer-based environment.

26. The execution unit of claim 20, wherein the plurality of directions received from the plurality of processing cores includes at least one of a first direction generated by executing the first set of importance sampling instructions on the first ray or a second direction generated by executing the second set of importance sampling instructions on the second ray.

27. The execution unit of claim 26, wherein the first direction comprises a direction for a first secondary ray that corresponds to the first ray, and the second direction comprises a direction for a second secondary ray that corresponds to the second ray.

28. The execution unit of claim 17, wherein the second processing core executes the second set of importance sampling instructions on the second ray to generate a direction for a second secondary ray that corresponds to the second ray.

* * * * *

UNITED STATES PATENT AND TRADEMARK OFFICE
CERTIFICATE OF CORRECTION

PATENT NO. : 12,159,344 B2
APPLICATION NO. : 18/339166
DATED : December 3, 2024
INVENTOR(S) : Robert A. Alfieri and Peter S. Shirley Page 1 of 1

It is certified that error appears in the above-identified patent and that said Letters Patent is hereby corrected as shown below:

In the Claims

Column 48, Claim 17, Line 6, please delete "ra" and insert --ray--.

Signed and Sealed this
Eleventh Day of March, 2025

Coke Morgan Stewart
*Acting Director of the United States Patent and Trademark Office*